United States Patent
Naito

(10) Patent No.: US 11,263,462 B2
(45) Date of Patent: Mar. 1, 2022

(54) NON-TRANSITORY COMPUTER READABLE RECORDING MEDIUM, EXTRACTION METHOD, AND INFORMATION PROCESSING APPARATUS

(71) Applicant: FUJITSU LIMITED, Kawasaki (JP)

(72) Inventor: Hirohisa Naito, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/908,756

(22) Filed: Jun. 23, 2020

(65) Prior Publication Data

US 2020/0320304 A1    Oct. 8, 2020

Related U.S. Application Data

(63) Continuation of application No. PCT/JP2017/047142, filed on Dec. 27, 2017.

(51) Int. Cl.
*G06T 15/00* (2011.01)
*G06K 9/00* (2022.01)
(Continued)

(52) U.S. Cl.
CPC ..... *G06K 9/00724* (2013.01); *G06K 9/00214* (2013.01); *G06K 9/00342* (2013.01); *G06T 19/00* (2013.01); *A63B 71/0669* (2013.01)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS

2009/0220124 A1*   9/2009   Siegel ............... G06K 9/00342
                                                          382/103
2010/0303303 A1   12/2010   Shen et al.
(Continued)

FOREIGN PATENT DOCUMENTS

CN          103310193 A      9/2013
EP          3 009 957 A2     4/2016
(Continued)

OTHER PUBLICATIONS

International Search Report and Written Opinion dated Feb. 27, 2018 for PCT/JP2017/047142 filed on Dec. 27, 2017, 6 pages including English Translation of the International Search Report.
(Continued)

*Primary Examiner* — Gordon G Liu
(74) *Attorney, Agent, or Firm* — Xsensus LLP

(57) ABSTRACT

An information processing apparatus (100) extracts, from among a plurality of elements, a first element that falls within a predetermined range from a first reference for determination of success or failure or a second element that falls within a predetermined range from a second reference for determination of a perfection level, on the basis of at least one of a determination result of the success or failure and a determination result of the perfection level. The information processing apparatus (100) extracts a portion corresponding to the first element or the second element from a 3D model moving image that is generated from 3D sensing data of a series of performances of the athlete or a video that is obtained by capturing the performances, and outputs the extracted moving image or the extracted video.

7 Claims, 24 Drawing Sheets

(51) Int. Cl.
*G06T 19/00* (2011.01)
*A63B 71/06* (2006.01)

(58) Field of Classification Search
USPC .......................................................... 345/419
See application file for complete search history.

(56) References Cited

U.S. PATENT DOCUMENTS

| | | | |
|---|---|---|---|
| 2012/0143358 A1* | 6/2012 | Adams | G06K 9/00342 700/92 |
| 2013/0223707 A1 | 8/2013 | Stephenson | |
| 2015/0227652 A1 | 8/2015 | Aonuma | |
| 2016/0296795 A1 | 10/2016 | Chang et al. | |
| 2017/0189784 A1 | 7/2017 | Sasaki | |
| 2019/0220658 A1 | 7/2019 | Kawashima et al. | |

FOREIGN PATENT DOCUMENTS

| | | |
|---|---|---|
| EP | 3 677 320 A1 | 7/2020 |
| EP | 3 679 994 A1 | 7/2020 |
| JP | 2001-251581 A | 9/2001 |
| JP | 2005-026837 A | 1/2005 |
| WO | 2012/061804 A1 | 5/2012 |
| WO | 2016/056449 A1 | 4/2016 |

OTHER PUBLICATIONS

Shin et al., "A Study on Motion Analysis of an Artistic Gymnastics by using Dynamic Image Processing—for a Development of Automatic Scoring System of Horizonal Bar," The Institute of Electronics, Information and Communication Engineers Technical Report, vol. 108, No. 47, ISSN 0913-5685, May 15, 2008, pp. 13-18.

"Techable," Retrieved from the Internet URL: https://techable.jp/archives/68011, on Jun. 16, 2020, pp. 1-3.

Shin, J., "A Study on Motion Analysis of an Artistic Gymnastics by using Dynamic Image Processing—for a development of automatic scoring system of horizontal bar", 2008 IEEE International Conference on Systems, Man and Cybernetics, May 2008, 6 pages, XP055617277.

Extended European Search Report dated Nov. 27, 2020, in corresponding European Patent Application No. 17936612.5.

* cited by examiner

FIG.3
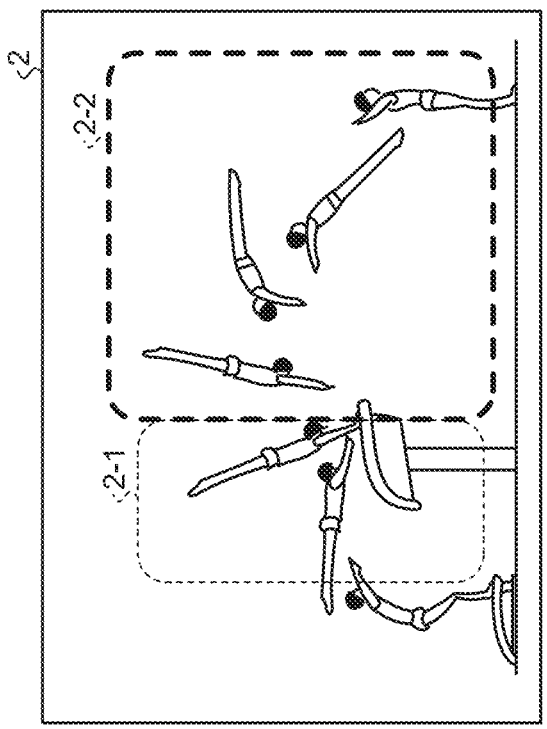
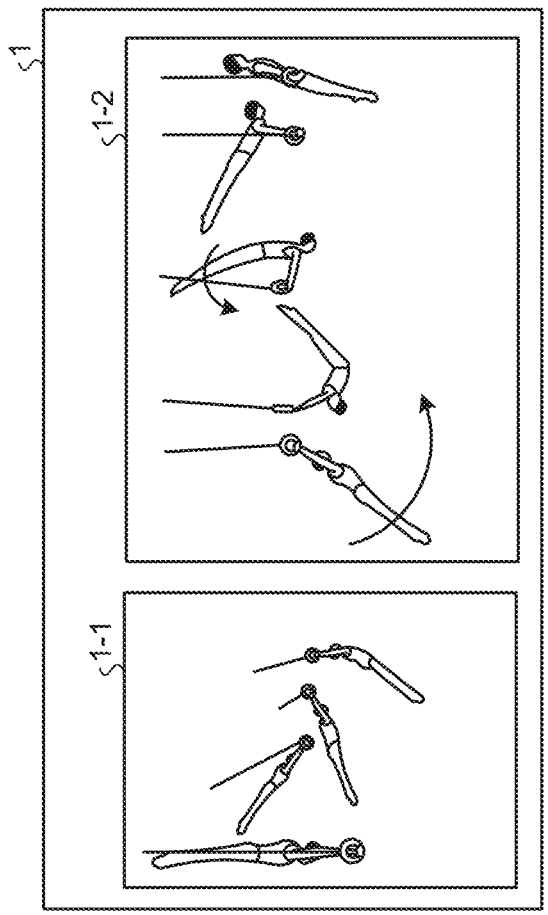

| RECORDING ID | FRAME NUMBER | SENSOR FRAME |
|---|---|---|
| P101 | 1 | FRAME CORRESPONDING TO RECORDING ID "P101" AND SENSOR FRAME NUMBER "1" |
| | 2 | FRAME CORRESPONDING TO RECORDING ID "P101" AND SENSOR FRAME NUMBER "2" |
| | 3 | FRAME CORRESPONDING TO RECORDING ID "P101" AND SENSOR FRAME NUMBER "3" |
| ... | ... | ... |

| RECORDING ID | FRAME NUMBER | VIDEO FRAME |
|---|---|---|
| P101 | 1 | VIDEO FRAME CORRESPONDING TO RECORDING ID "P101" AND FRAME NUMBER "1" |
| | 2 | VIDEO FRAME CORRESPONDING TO RECORDING ID "P101" AND FRAME NUMBER "2" |
| | 3 | VIDEO FRAME CORRESPONDING TO RECORDING ID "P101" AND FRAME NUMBER "3" |
| ... | ... | ... |

| RECORDING ID | FRAME NUMBER | X0 | Y0 | Z0 | ... | X17 | Y17 | Z17 |
|---|---|---|---|---|---|---|---|---|
| P101 | 1 | 100 | 20 | 0 | | 200 | 40 | 5 |
| P101 | 2 | 101 | 25 | 5 | | 202 | 39 | 15 |
| P101 | 3 | 110 | 32 | 7 | | 210 | 45 | 12 |
| ... | ... | | | | | | | |
| P101 | 100 | 201 | 125 | 30 | | 225 | 150 | 10 |

FIG.10

| RECORDING ID | FRAME NUMBER | SKELETON DATA | 3D MODEL DATA |
|---|---|---|---|
| P101 | 1 | SKELETON DATA WITH RECORDING ID "P101" AND FRAME NUMBER "1" | 3D MODEL DATA WITH RECORDING ID "P101" AND FRAME NUMBER "1" |
| | 2 | SKELETON DATA WITH RECORDING ID "P101" AND FRAME NUMBER "2" | 3D MODEL DATA WITH RECORDING ID "P101" AND FRAME NUMBER "2" |
| | 3 | SKELETON DATA WITH RECORDING ID "P101" AND FRAME NUMBER "3" | 3D MODEL DATA WITH RECORDING ID "P101" AND FRAME NUMBER "3" |
| ... | ... | ... | ... |

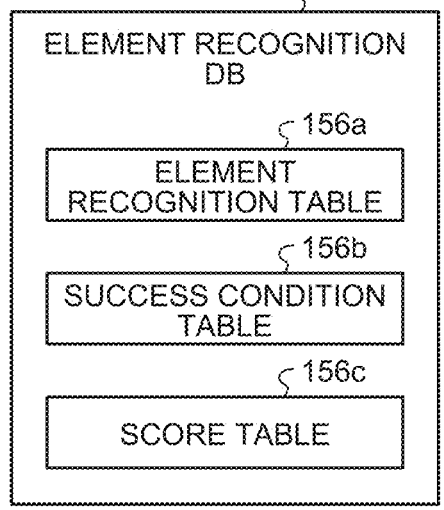

156 ELEMENT RECOGNITION DB

156a ELEMENT RECOGNITION TABLE

156b SUCCESS CONDITION TABLE

156c SCORE TABLE

FIG.12

| ELEMENT NAME | GROUP | DIFFICULTY LEVEL | SCORE | SUCCESS CONDITION |
|---|---|---|---|---|
| MUSCLE-UP TRANSITION FROM HANG | G1 | A | ○○ | STATIC POSTURE NAME AND KINETIC POSTURE NAME FOR SUCCESS OF ELEMENT "MUSCLE-UP TRANSITION FROM HANG" |
| BACK UPRISE TO MALTESE (TWO SECONDS) | G3 | E | ○○ | STATIC POSTURE NAME AND KINETIC POSTURE NAME FOR SUCCESS OF ELEMENT "BACK UPRISE TO MALTESE (TWO SECONDS)" |
| KIP TO SUPPORT | G1 | A | ○○ | STATIC POSTURE NAME AND KINETIC POSTURE NAME FOR SUCCESS OF ELEMENT "KIP TO SUPPORT" |
| MALTESE HOLD (TWO SECOND) | G2 | D | ○○ | STATIC POSTURE NAME AND KINETIC POSTURE NAME FOR SUCCESS OF ELEMENT "MALTESE HOLD (TWO SECOND)" |
| AZARIAN: STRAIGHT BODY BACKWARD ROLL TO CROSS (TWO SECONDS) | G2 | D | ○○ | STATIC POSTURE NAME AND KINETIC POSTURE NAME FOR SUCCESS OF ELEMENT "AZARIAN: STRAIGHT BODY BACKWARD ROLL TO CROSS (TWO SECONDS)" |
| YAMAWAKI: DOUBLE SALTO FORWARDS WITH TUCKED TO HANG | G1 | C | ○○ | STATIC POSTURE NAME AND KINETIC POSTURE NAME FOR SUCCESS OF ELEMENT "YAMAWAKI: DOUBLE SALTO FORWARDS WITH TUCKED TO HANG" |
| JONASSON: DOUBLE SALTO FORWARDS WITH PICKED TO HANG | G1 | D | ○○ | STATIC POSTURE NAME AND KINETIC POSTURE NAME FOR SUCCESS OF ELEMENT "JONASSON: DOUBLE SALTO FORWARDS WITH PICKED TO HANG" |
| BACK UPRISE TO STRADDLE PLANCHE (TWO SECONDS) | G3 | C | ○○ | STATIC POSTURE NAME AND KINETIC POSTURE NAME FOR SUCCESS OF ELEMENT "BACK UPRISE TO STRADDLE PLANCHE (TWO SECONDS)" |
| FELGE TO HANDSTAND (TWO SECONDS) | G1 | C | ○○ | STATIC POSTURE NAME AND KINETIC POSTURE NAME FOR SUCCESS OF ELEMENT "FELGE TO HANDSTAND (TWO SECONDS)" |
| ... | ... | ... | ... | ... |

FIG.13

| STATIC POSTURE NAME | STATIC POSTURE SUCCESS CONDITION |
|---|---|
| STATIC POSTURE A1 | CONDITION FOR SUCCESS OF STATIC POSTURE A1 |
| STATIC POSTURE A2 | CONDITION FOR SUCCESS OF STATIC POSTURE A2 |
| STATIC POSTURE A3 | CONDITION FOR SUCCESS OF STATIC POSTURE A3 |
| ... | ... |

| KINETIC POSTURE NAME | KINETIC POSTURE SUCCESS CONDITION |
|---|---|
| KINETIC POSTURE B1 | CONDITION FOR SUCCESS OF KINETIC POSTURE B1 |
| KINETIC POSTURE B2 | CONDITION FOR SUCCESS OF KINETIC POSTURE B2 |
| KINETIC POSTURE B3 | CONDITION FOR SUCCESS OF KINETIC POSTURE B3 |
| ... | ... |

FIG.14

| STATIC POSTURE NAME | STATIC POSTURE SUCCESS CONDITION | | | | | | |
|---|---|---|---|---|---|---|---|
| | SPINE ANGLE | HIP ANGLE | ARM ANGLE | ELBOW ANGLE | KNEE ANGLE | INTER-KNEE ANGLE | SHOULDER ANGLE |
| CROSS | $\leq \theta_{A1}$ | $\geq \theta_{A2}$ | $\theta_{A31}$ TO $\theta_{A32}$ | $\geq \theta_{A4}$ | $\geq \theta_{A5}$ | $\leq \theta_{A6}$ | $\geq \theta_{A7}$ |

| KINETIC POSTURE NAME | KINETIC POSTURE SUCCESS CONDITION |
|---|---|
| KINETIC POSTURE B1 | TRANSITION OF EACH OF JOINT POSITIONS AND TRANSITION OF ANGLE BASED ON EACH OF JOINT POSITIONS FOR SUCCESS OF "KINETIC POSTURE B1" |
| KINETIC POSTURE B2 | TRANSITION OF EACH OF JOINT POSITIONS AND TRANSITION OF ANGLE BASED ON EACH OF JOINT POSITIONS FOR SUCCESS OF "KINETIC POSTURE B2" |
| ... | ... |

FIG.17

| STATIC POSTURE NAME "CROSS": SHOULDER ANGLE | DEDUCTION |
|---|---|
| $0° \leq \theta < 6°$ | NO DEDUCTION |
| $6° \leq \theta < 16°$ | 0.1 (SMALL FAULT) |
| $16° \leq \theta < 31°$ | 0.3 (MEDIUM FAULT) |
| $31° \leq \theta < 46°$ | 0.5 (LARGE FAULT) |
| $46° \leq \theta$ | ELEMENT IS UNSUCCESSFUL |

FIG.18

| KINETIC POSTURE NAME "KINETIC POSTURE B1": SHOULDER ANGLE | DEDUCTION |
|---|---|
| $0° \leq \theta < 6°$ | NO DEDUCTION |
| $6° \leq \theta < 16°$ | 0.1 (SMALL FAULT) |
| $16° \leq \theta < 31°$ | 0.3 (MEDIUM FAULT) |
| $31° \leq \theta < 46°$ | 0.5 (LARGE FAULT) |
| $46° \leq \theta$ | ELEMENT IS UNSUCCESSFUL |

FIG.21

| ELEMENT NAME (FIRST ELEMENT NAME, SECOND ELEMENT NAME) | EVALUATION ITEM | FIRST DIGEST VIDEO | SECOND DIGEST VIDEO |
|---|---|---|---|
| CROSS | SHOULDER ANGLE | FIRST DIGEST VIDEO OF CROSS | SECOND DIGEST VIDEO OF CROSS |
| BACK UPRISE TO MALTESE (KINETIC POSTURE IN BACK UPRISE TO MALTESE) | SHOULDER ANGLE | FIRST DIGEST VIDEO OF BACK UPRISE TO MALTESE | SECOND DIGEST VIDEO OF BACK UPRISE TO MALTESE |
| ... | ... | ... | ... |

157

NON-TRANSITORY COMPUTER READABLE RECORDING MEDIUM, EXTRACTION METHOD, AND INFORMATION PROCESSING APPARATUS

CROSS-REFERENCE TO RELATED APPLICATION

This application is a continuation application of International Application PCT/JP2017/047142 filed on Dec. 27, 2017 and designating U.S., the entire contents of which are incorporated herein by reference.

FIELD

The present invention relates to an extraction program, and the like.

BACKGROUND

As a conventional technology for extracting partial videos from a series of videos, a technology for generating a digest video has been known. In the conventional technology, partial videos that mainly contain score scenes among videos of sports games are generated as the digest video.

Further, another conventional technology for extracting a video of a specific scene by using various kinds of index information added to videos has been known. For example, various kinds of index information include an index that represents a segment of video scenes, an index that represents a timing of an offensive motion of a player, and an index that represents a timing of a motion related to a score. In the conventional technology, a video of a specific scene is identified from a combination of the indices, and the identified video is extracted.

Patent Literature 1: Japanese Laid-open Patent Publication No. 2005-26837
Patent Literature 2: Japanese Laid-open Patent Publication No. 2001-251581

SUMMARY

According to an aspect of the embodiment of the invention, non-transitory computer readable recording medium stores an extraction program that causes a computer to execute a process including: acquiring at least one of a determination result of success or failure of each of a plurality of elements included in a series of performances given by an athlete and a determination result of a perfection level of each of the elements, on the basis of 3D sensing data of the series of performances; extracting one of a first element and a second element, the first element falling within a predetermine range from a first reference for determination of the success or failure, the second element falling within a predetermined range from a second reference for determination of the perfection level, from among the plurality of elements on the basis of at least one of the determination result of the success or failure and the determination result of the perfection level; extracting a portion corresponding to one of the first element and the second element from one of a 3D model moving image that is generated from the 3D sensing data of the series of performances and a video that is obtained by capturing the performances; and outputting one of a 3D model moving image of the extracted portion and a video of the extracted portion.

BRIEF DESCRIPTION OF DRAWINGS

FIG. 3 is a diagram illustrating an example of kinetic postures.
FIG. 6 is a diagram illustrating an example of a data structure of a sensing DB according to the first embodiment.
FIG. 7 is a diagram illustrating an example of a data structure of a video DB according to the first embodiment.
FIG. 10 is a diagram illustrating an example of a data structure of a 3D model DB according to the first embodiment.
FIG. 11 is a diagram illustrating an example of a data structure of an element recognition DB according to the first embodiment.
FIG. 12 is a diagram illustrating an example of a data structure of an element recognition table according to the first embodiment.
FIG. 13 is a diagram illustrating an example of a data structure of a success condition table.
FIG. 14 is a diagram for explaining an example of a relationship between a static posture name and a static posture success condition.
FIG. 17 is a diagram for explaining the number of points to be deducted with respect to an evaluation item for a static posture.
FIG. 18 is a diagram for explaining the number of points to be deducted with respect to an evaluation item for a kinetic posture.
FIG. 21 is a diagram illustrating an example of a data structure of a digest video DB according to the first embodiment.

DESCRIPTION OF EMBODIMENTS

Embodiments of an extraction program, an extraction method, and an information processing apparatus disclosed in the present application will be described in detail below based on the drawings. The present invention is not limited by the embodiments below.

First Embodiment

However, in the conventional technologies as described above, there is a problem in that a video is not extracted with reference to a score from a series of videos that are related to scoring competitions.

For example, the conventional technologies are for extracting a partial video of a specific play in a case of extracting the partial video from a series of videos, but not for extracting a video with reference to a score in a scoring competition.

According to one aspect, an object of the present embodiment is to provide an extraction program, an extraction method, and an information processing apparatus capable of extracting a video based on a score from a series of videos related to a scoring competition.

Figure 1:
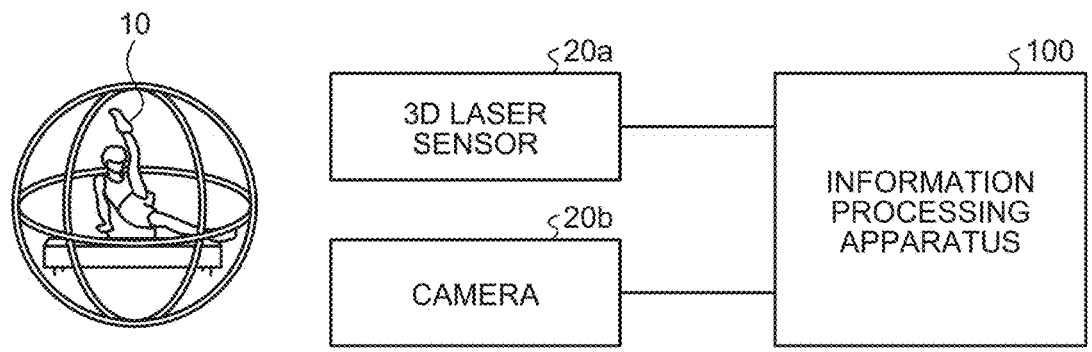
FIG. 1 is a diagram illustrating an example of a system according to a first embodiment.

FIG. 1 is a diagram illustrating an example of a system according to a first embodiment. As illustrated in FIG. 1, the system includes a three-dimensional (3D) laser sensor 20a, a camera 20b, and an information processing apparatus 100. The information processing apparatus 100 is connected to the 3D laser sensor 20a and the camera 20b.

The 3D laser sensor 20a is a sensor that performs 3D sensing on an athlete 10. The 3D laser sensor 20a outputs sensor data that is a sensing result to the information processing apparatus 100.

For example, the sensor data includes a plurality of frames, and a frame number for uniquely identifying a frame is assigned to each of the frames in ascending order. The sensor data is one example of 3D sensing data. Each of the frames includes distance information from the 3D laser sensor 20a to each of points on the athlete 10. With use of the sensor data, it is possible to estimate a three-dimensional position of each of joints of the athlete 10 in each of the frames and generates a 3D model of the athlete 10.

The camera 20b is a camera that captures a video of the athlete 10. The camera 20b outputs captured video data to the information processing apparatus 100. For example, the video data includes a plurality of frames, and a frame number for uniquely identifying a frame is assigned to each of the frames in ascending order. Each of the frames includes information on a still image that is captured by the camera 20b at each of timings.

In the following descriptions, a frame included in the sensor data will be appropriately described as a "sensor frame". A frame included in the video data will be described as a "video frame".

The athlete 10 gives a predetermined performance that is to be scored, in front of the 3D laser sensor 20a and the camera 20b. The athlete 10 is one example of an athlete. In the first embodiment, as one example, a case will be described in which the athlete 10 gives a gymnastics performance; however, the same can be similarly applied to other scoring competitions.

Examples of the other scoring competitions include trampoline, diving, figure skating, karate styles, ballroom dancing, snowboarding, skateboarding, aerial skiing, surfing, and ski jumping and mogul air and turns, a part of which is to be scored. Further, the technology may be applied to determination of postures in classical ballet, ballroom dancing, baseball, basketball, and the like. Furthermore, the technology may be applied to determination of winning techniques in combat competitions, such as kendo, judo, wrestling, and sumo. Moreover, the technology may be applied to evaluation on whether a barbell is lifted in weight lifting.

The gymnastics is a continuous movement, and a plurality of elements are continuously present in the continuous movement. Further, in some cases, movements as "connections" that do not correspond to elements may present at the start or in the middle of the gymnastics. During gymnastics performance, a referee determines and evaluates success or failure of elements and perfection levels of the elements by observing postures of the elements, postures of basic movements of the elements, and postures between the elements.

Here, the "posture" indicates a relative positional relationship among a head portion, a trunk, and extremities. In the first embodiment, as one example, a posture in which a static condition needs to be held between elements or the like will be described as a "static posture". A dynamic posture will be described as a "kinetic posture". For example, an element is determined by a combination of a type of the "static posture" and a type of the "kinetic posture".

Figure 2:
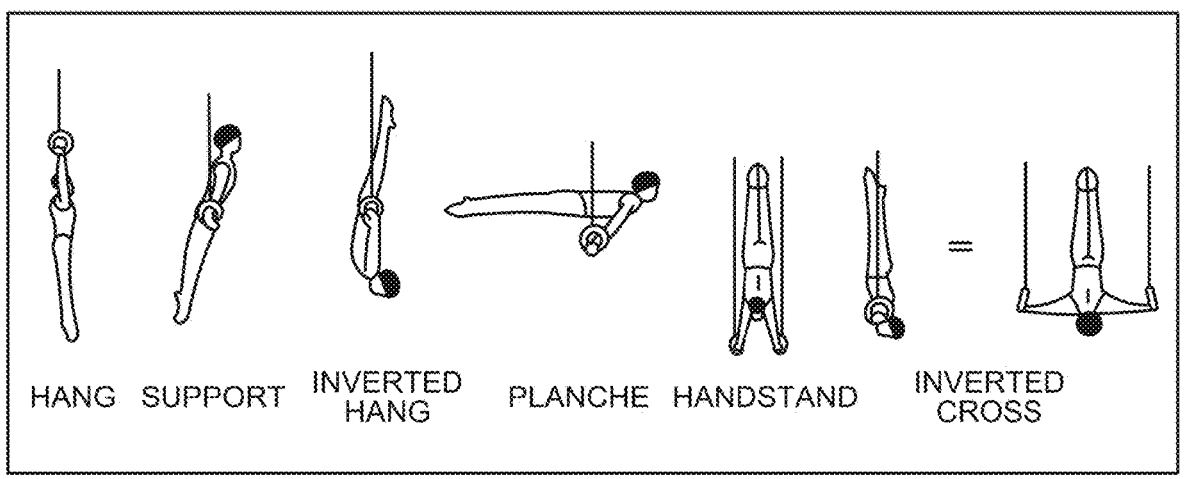
FIG. 2 is a diagram illustrating an example of static postures.

FIG. 2 is a diagram illustrating an example of static postures. The static posture is a posture that is performed by the athlete 10 between elements. Examples of the static posture include a hang, a support, an inverted hang, the Planche, a handstand, and an inverted cross. The static postures illustrated in FIG. 2 are mere examples, and other static postures are present.

FIG. 3 is a diagram illustrating an example of kinetic postures. For example, a kinetic posture (part) 1 of rings includes a swing (first half) 1-1, and a swing (second half) 1-2. A kinetic posture 2 of a vault includes a first phase 2-1 and a second phase 2-2.

Figure 4:
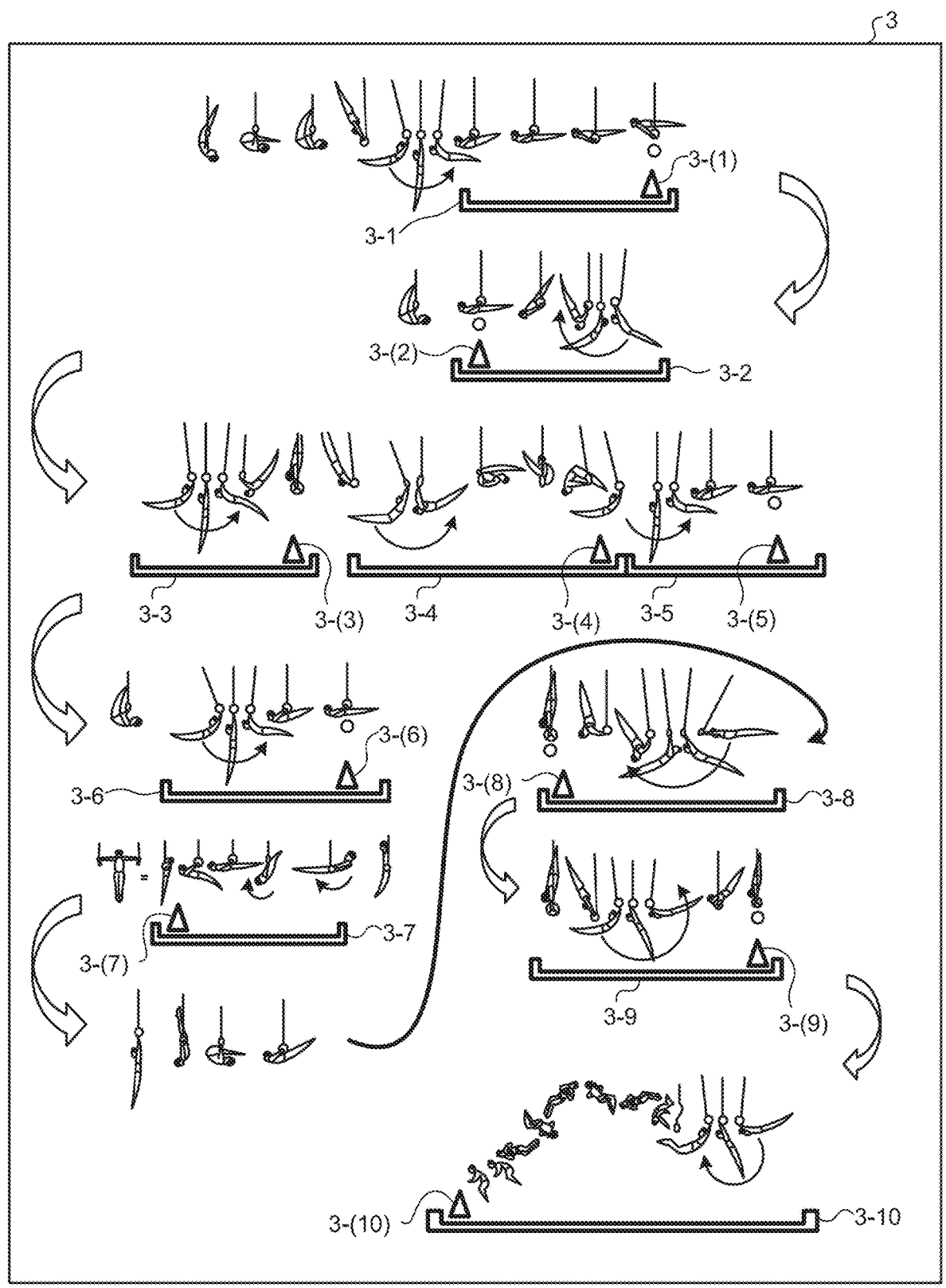
FIG. 4 is a diagram illustrating an example of rings performance.

FIG. 4 is a diagram illustrating an example of rings performance. As illustrated in FIG. 4, rings performance 3 includes kinetic postures 3-1 to 3-10.

The kinetic posture 3-1 corresponds to an element of "back uprise to Planche (two seconds)". A static posture 3-(1) is included at the end of the element of the kinetic posture 3-1.

The kinetic posture 3-2 corresponds to an element of "felge to Maltese (two seconds)". A static posture 3-(2) is included at the end of the element of the kinetic posture 3-2.

The kinetic posture 3-3 corresponds to an element of "back uprise to inverted cross". A static posture 3-(3) is included at the end of the element of the kinetic posture 3-3.

The kinetic posture 3-4 corresponds to an element of "piked Yamawaki". A static posture 3-(4) is included at the end of the element of the kinetic posture 3-4.

The kinetic posture 3-5 corresponds to an element of "back uprise to Maltese (two seconds)". A static posture 3-(5) is included at the end of the element of the kinetic posture 3-5.

The kinetic posture 3-6 corresponds to an element of "back uprise to back lever (two seconds)". A static posture 3-(6) is included at the end of the element of the kinetic posture 3-6.

The kinetic posture 3-7 corresponds to an element of "Azarian". A static posture 3-(7) is included at the end of the element of the kinetic posture 3-7.

The kinetic posture 3-8 corresponds to an element of "shoot to handstand (two seconds)". A static posture 3-(8) is included at the end of the element of the kinetic posture 3-8.

The kinetic posture 3-9 corresponds to an element of "back uprise to handstand (two seconds)". A static posture 3-(9) is included at the end of the element of the kinetic posture 3-9.

The kinetic posture 3-10 corresponds to an element of "double salto backwards with double twist". A static posture 3-(10) is included at the end of the element of the kinetic posture 3-10.

Referring back to the explanation of FIG. 1, the information processing apparatus 100 generates 3D model data based on the sensor data acquired from the 3D laser sensor 20a, and determines a difficulty score (D-score) and an execution score (E-score) of a performance given by the athlete 10. The D-score is a score that is calculated based on success or failure of elements. The E-score is a score that is calculated based on a point-deduction system in accordance with perfection levels of elements.

Here, the information processing apparatus 100 generates and outputs a video of a scene in which whether a criterion for determination of success or failure of an element related to the D-score is met is unclear, on the basis of a sensor frame acquired from the 3D laser sensor 20a or a video frame acquired from the camera 20b. Further, the information processing apparatus 100 generates and outputs a video of a scene in which whether a criterion for determination of a perfection level of an element related to the E-score is met is unclear.

Figure 5:
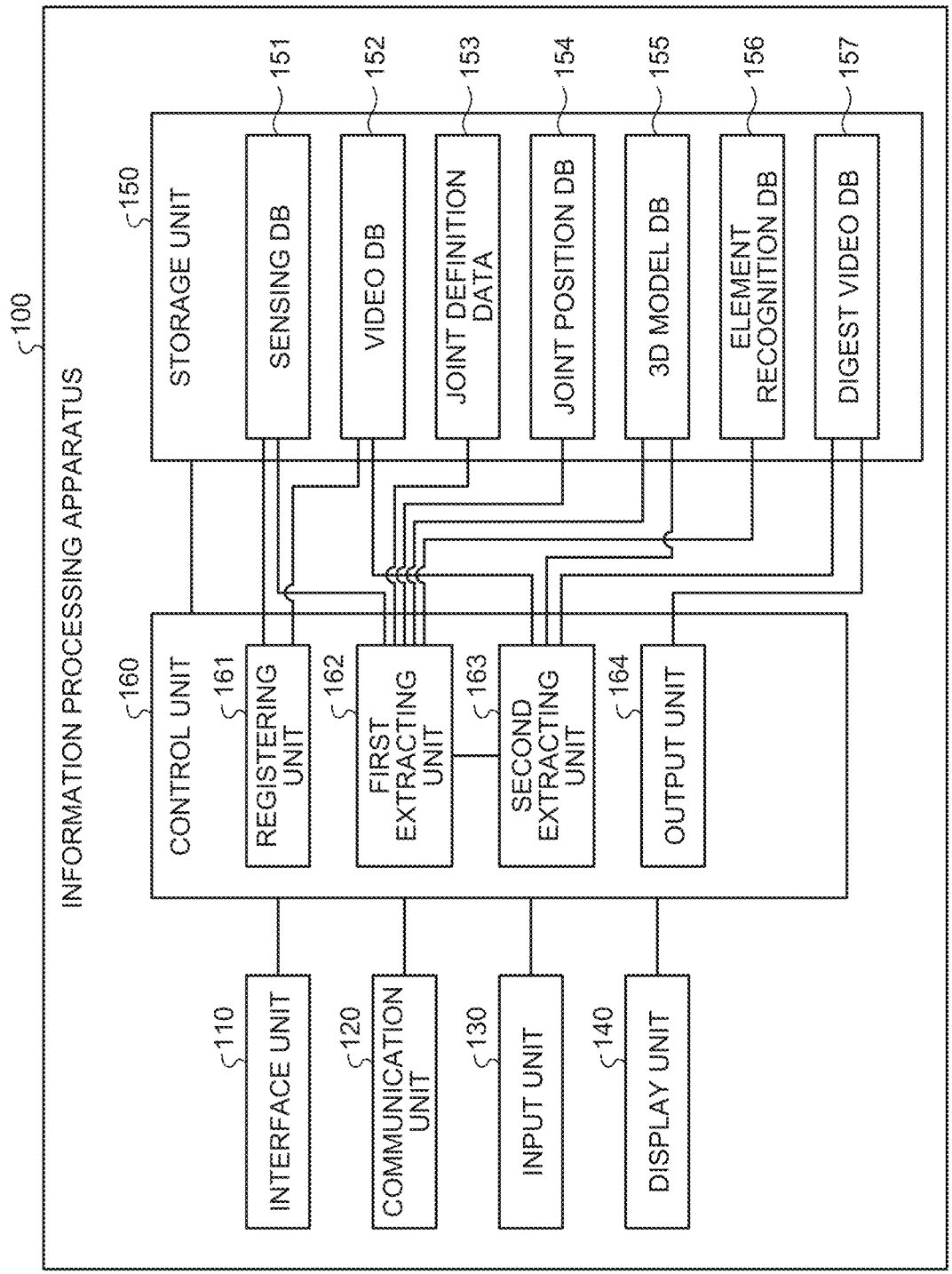
FIG. 5 is a functional block diagram illustrating a configuration of an information processing apparatus according to the first embodiment.

FIG. 5 is a functional block diagram illustrating a configuration of the information processing apparatus according to the first embodiment. As illustrated in FIG. 5, the information processing apparatus 100 includes an interface unit 110, a communication unit 120, an input unit 130, a display unit 140, a storage unit 150, and a control unit 160.

The interface unit 110 is connected to the 3D laser sensor 20a and the camera 20b. The interface unit 110 acquires sensor data from the 3D laser sensor 20a, and outputs the acquired sensor data to the control unit 160. The interface unit 110 acquires video data from the camera 20b, and outputs the acquired video data to the control unit 160.

The communication unit 120 is a device that performs data communication with other devices via a network. The communication unit 120 corresponds to a communication device. The information processing apparatus 100 may be connected to the 3D laser sensor 20a and the camera 20b via a network. In this case, the communication unit 120 acquires the sensor data from the 3D laser sensor 20a and acquires the video data from the camera 20b via the network.

The input unit 130 is an input device for inputting various kinds of information to the information processing apparatus 100. The input unit 130 corresponds to a keyboard, a mouse, a touch panel, or the like.

The display unit 140 is a display device that displays information on a display screen output from the control unit 160. The display unit 140 corresponds to a liquid crystal display, a touch panel, or the like.

The storage unit 150 includes a sensing database (DB) 151, a video DB 152, a joint definition data 153, a joint position DB 154, a 3D model DB 155, an element recognition DB 156, and a digest video DB 157. The storage unit 150 corresponds to a semiconductor memory device, such as a random access memory (RAM), a read only memory (ROM), or a flash memory, or a storage device, such as a hard disk drive (HDD).

The sensing DB 151 is a DB for storing sensor data acquired from the 3D laser sensor 20a. FIG. 6 is a diagram illustrating an example of a data structure of the sensing DB according to the first embodiment. The sensing DB 151 associates a recording ID, a frame number, and a sensor frame. The recording identification (ID) is information for uniquely identifying a single performance given by the athlete 10. The frame number is a number for uniquely identifying each of frames (sensor frames) corresponding to the same recording ID. The sensor frame is a sensor frame that is included in sensor data sensed by the 3D laser sensor 20a.

The video DB 152 is a DB for storing video data acquired from the camera 20b. FIG. 7 is a diagram illustrating an example of a data structure of the video DB according to the first embodiment. The video DB 152 associates a recording ID, a frame number, and a video frame. The recording ID is information for uniquely identifying a single performance given by the athlete 10. The frame number is a number for uniquely identifying each of frames (video frames) corresponding to the same recording ID. The video frame is a video frame that is included in video data captured by the camera 20b.

Figures 8, 9:
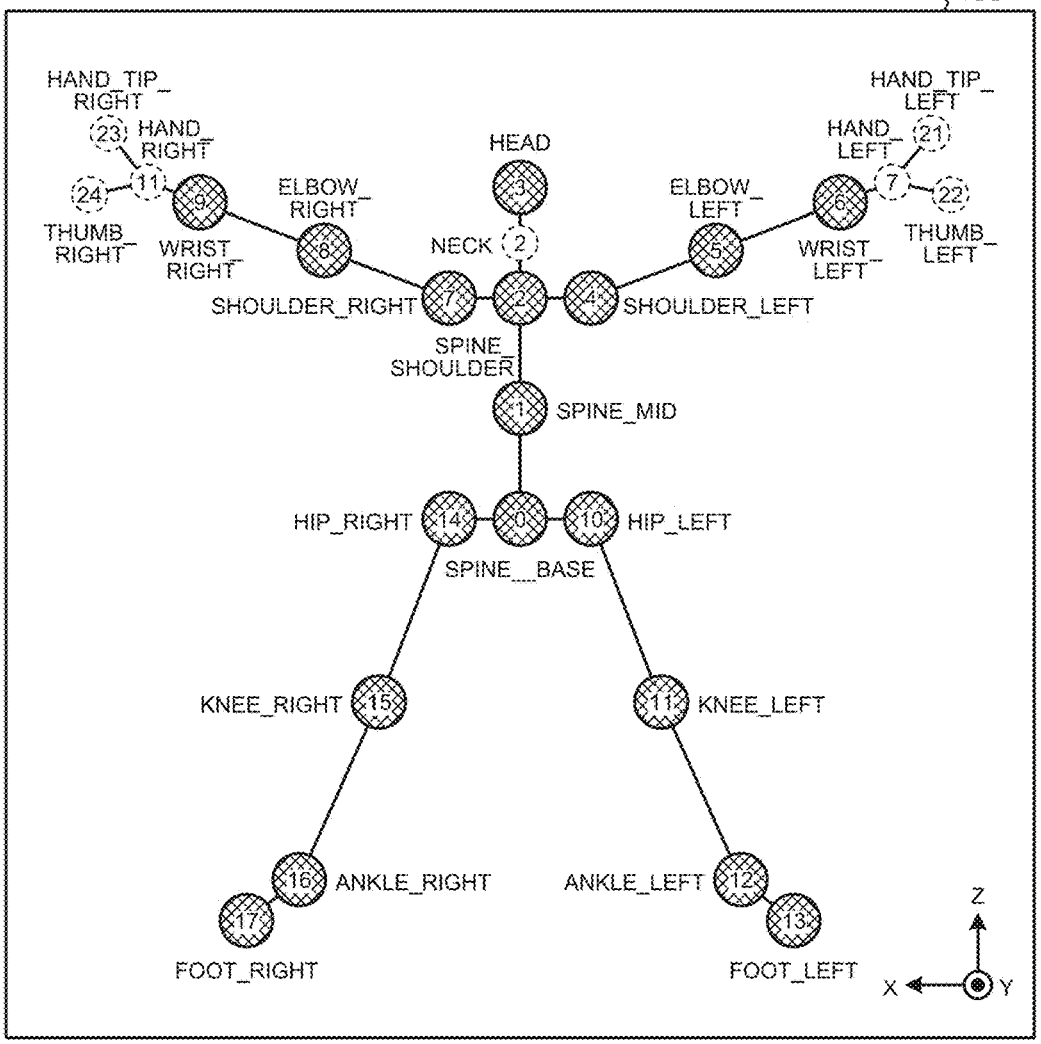
FIG. 8 is a diagram illustrating an example of joint definition data according to the first embodiment.
FIG. 9 is a diagram illustrating an example of a data structure of a joint position DB according to the first embodiment.

The joint definition data 153 is for defining each of joint positions of an athlete (the athlete 10). FIG. 8 is a diagram illustrating an example of the joint definition data according to the first embodiment. As illustrated in FIG. 8, the joint definition data 153 stores therein information in which a number is assigned to each of joints that are identified by a known skeleton model. For example, as illustrated in FIG. 8, a number 7 is assigned to a right shoulder joint (SHOULDER_RIGHT), a number 5 is assigned to a left elbow joint (ELBOW_LEFT), a number 11 is assigned to a left knee joint (KNEE_LEFT), and a number 14 is assigned to a right hip joint (HIP_RIGHT). Here, in the first embodiment, with respect to a right elbow joint assigned with a number 8, an X coordinate may be denoted by X8, a Y coordinate may be denoted by Y8, and a Z coordinate may be denoted by Z8. Meanwhile, numbers in dotted lines indicate joints or the like that are identified from the skeleton model but are not used for scoring.

The joint position DB 154 is positional data of each of the joints of the athlete 10, where the positional data is generated based on the sensor data of the 3D laser sensor 20a. FIG. 9 is a diagram illustrating an example of a data structure of the joint position DB according to the first embodiment. As illustrated in FIG. 9, the joint position DB 154 associates a recording ID, a frame number, and "X0, Y0, Z0, . . . , X17, Y17, Z17". Explanation of the recording ID is the same as the explanation given with the sensing DB 151.

In FIG. 9, the frame number is a number for uniquely identifying each of sensing frames corresponding to the same recording ID. "X0, Y0, Z0, . . . , X17, Y17, Z17" are XYZ coordinates of the respective joints: for example, "X0, Y0, Z0" is a three-dimensional coordinate of a joint assigned with a number 0 in FIG. 8.

FIG. 9 indicates a temporal change of each of the joints in sensor data with a recording ID of "P101", where it is indicated that, with a frame number of "1", the positions of the respective joints are located at "X0=100, Y0=20, Z0=0, . . . , X17=200, Y17=40, Z17=5". Further, with the frame number "2", it is indicated that the positions of the respective joints are moved to "X0=101, Y0=25, Z0=5, . . . , X17=202, Y17=39, Z17=15".

The 3D model DB 155 is a database for storing information on a 3D model of the athlete 10, where the 3D model is generated based on the sensor data. FIG. 10 is a diagram illustrating an example of a data structure of the 3D model DB according to the first embodiment. As illustrated in FIG. 10, the 3D model DB 155 associates a recording ID, a frame number, skeleton data, and 3D model data. Explanation of the recording ID and the frame number is the same as the explanation given with the sensing DB 151.

The skeleton data is data indicating a skeleton of the athlete 10, where the skeleton is estimated by connecting each of the joint positions. The 3D model data is data of a 3D model of the athlete 10, where the 3D model is estimated based on information acquired from the sensor data and based on the skeleton data.

The element recognition DB 156 is a DB that is used to recognize elements (static postures and kinetic postures) included in a performance given by the athlete 10. FIG. 11 is a diagram illustrating an example of a data structure of the element recognition DB according to the first embodiment. As illustrated in FIG. 11, the element recognition DB 156 includes an element recognition table 156a, a success condition table 156b, and a score table 156c.

The element recognition table 156a is a table for holding various kinds of information for recognizing elements. FIG. 12 is a diagram illustrating an example of a data structure of the element recognition table according to the first embodiment. As illustrated in FIG. 12, the element recognition table 156a associates an element name, a group, a difficulty level, a score, and a success condition. The element name is a name of an element for uniquely identifying the element. The group indicates a group to which the element corresponding to the element name belongs. The difficulty level indicates a difficulty level of the element corresponding to the element name. For example, a difficulty level "A" indicates the lowest difficulty level, and the difficulty level increases in order of the difficulty levels A, B, C, D, and E.

The score is the number of points corresponding to the element name and used to calculate the D-score. The score increases with an increase in the difficulty level of an element. For example, an element name of "muscle-up transition from hang" belongs to a group "G1" at a difficulty level of "A". The success condition indicates a static posture name and a kinetic posture name corresponding to success of an element. Success conditions of the static postures and the kinetic postures are defined by the success condition table 156b. Further, the success conditions of the static postures and the kinetic postures are set for each of items, and each of the items is appropriately described as an "evaluation item".

FIG. 13 is a diagram illustrating an example of a data structure of the success condition table. The success condition table 156b includes a table 170a and a table 170b. The table 170a associates a static posture name and a static posture success condition. The static posture name indicates a name for uniquely identifying a static posture. The static posture success condition indicates a condition for success of the static posture. In the following, one example of a relationship between the static posture name and the static posture success condition will be described.

FIG. 14 is a diagram for explaining one example of the relationship between the static posture name and the static posture success condition. For example, a static posture name of "cross" is associated with a static posture success condition including a "spine angle", a "hip angle", an "arm angle", an "elbow angle", a "knee angle", an "inter-knee angle", and a "shoulder angle". The "spine angle", the "hip angle", the "arm angle", the "elbow angle", the "knee angle", the "inter-knee angle", and the "shoulder angle" will be described with reference to FIG. 8.

The spine angle (Spine_Angle of an incline) is an angle between a line segment that passes through joints assigned with the numbers 0 and 2 and the Z axis. For example, if the spine angle is "equal to or smaller than $\theta_{A1}$", it is indicated that the center of the body of the athlete is located in a vertically-upward direction.

The hip angle (Hip_Angle between body) is an angle between a line segment that passes through joints assigned with the numbers 0 and 1 and a line segment that passes through joints assigned with the numbers 10 and 11. Alternatively, the hip angle is an angle between the line segment that passes through the joints assigned with the numbers 0 and 1 and a line segment that passes through joints assigned with the numbers 14 and 15. For example, if the hip angle is "equal to or larger than $\theta_{A2}$", it is indicated that the hip of the athlete is extended straight.

The arm angle (Arm_Angle between body) is an angle between a line segment that passes through the joints assigned with the numbers 1 and 2 and a line segment that passes through joints assigned with the numbers 4 and 5. Further, the arm angle is an angle between the line segment that passes through the joints assigned with the numbers 1 and 2 and a line segment that passes through joints assigned with the numbers 7 and 8. For example, if the arm angle is "$\theta_{A31}$ to $\theta_{A32}$", it is indicated that the arms of the athlete are extended horizontally.

The elbow angle (Elbow_Angle) is an angle between a line segment that passes through the joints assigned with the numbers 4 and 5 and a line segment that passes through the joints assigned with the numbers 5 and 6. Further, the elbow angle is an angle between a line segment that passes through the joints assigned with the numbers 7 and 8 and a line segment that passes through the joints assigned with the numbers 8 and 9. For example, if the elbow angle is "equal to or larger than $\theta_{A4}$", it is indicated that the elbows of the athlete are extended straight.

The knee angle (Knee_Angle) is an angle between a line segment that passes through the joints assigned with the numbers 10 and 11 and a line segment that passes through the joints assigned with the numbers 11 and 12. Further, the knee angle is an angle between a line segment that passes through joints assigned with the numbers 14 and 15 and a line segment that passes through joints assigned with the numbers 15 and 16. For example, if the knee angle is "equal to or larger than $\theta_{A5}$", it is indicated that the knees of the athlete are extended straight.

The inter-knee angle (Knees_sep. Angle) is an angle between a line segment that passes through the joints assigned with the numbers 10 and 11 and a straight line that passes through the joints assigned with the numbers 14 and 15. For example, if the inter-knee angle is "$\theta_{A6}$", it is indicated that legs of the athlete are not opened.

The shoulder angle is a larger one of an angle $\theta_R$ between a line segment that passes through the joints assigned with the numbers 7 and 9 and a horizontal reference and an angle $\theta_L$ between a line segment that passes through the joints assigned with the numbers 4 and 6 and the horizontal reference. For example, if the shoulder angle is 0°, it is indicated that the arms of the athlete are extended horizontally.

For example, in the example illustrated in FIG. 14, if all of success conditions, such as the spine angle of being "equal to or smaller than $\theta_{A1}$", the hip angle of being "equal to or larger than $\theta_{A}$", the arm angle of being "$\theta_{A31}$ to $\theta_{A32}$", the elbow angle of being "equal to or larger than $\theta_{A4}$", the knee angle of being "equal to or larger than $\theta_{A5}$", the inter-knee angle of being "equal to or smaller than $\theta_{A6}$", and the shoulder angle of being "equal to or smaller than $\theta_{A7}$" are met, the element with the static posture name of "cross" is successful.

The table 170b associates a kinetic posture name and a kinetic posture success condition. The kinetic posture name indicates a name for uniquely identifying a kinetic posture. The kinetic posture success condition indicates a condition for success of the kinetic posture.

Figures 15, 16:
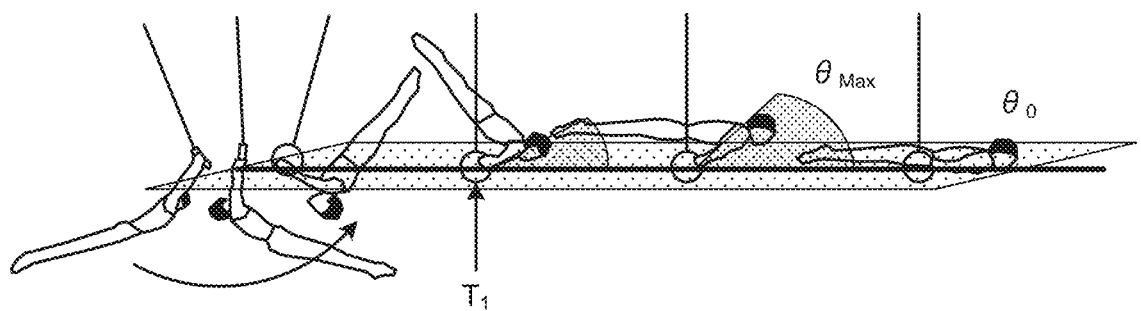
FIG. 15 is a diagram illustrating an example of a relationship between a kinetic posture name and a kinetic posture success condition.
FIG. 16 is a diagram for supplementally explaining the kinetic posture success condition.

FIG. 15 illustrates an example of a relationship between the kinetic posture name and the kinetic posture success condition. For example, the kinetic posture success condition defines a relationship among transition of each of the joint positions for success of a corresponding kinetic posture, transition of angles based on each of the joint positions, and a success condition.

FIG. 16 is a diagram for supplementary explaining the kinetic posture success condition. In FIG. 16, as one example, a case will be described in which the kinetic posture success condition is defined by using a shoulder angle during transition from a swing to a static element. For example, the shoulder angle is an angle between a straight line that passes through the joints assigned with the numbers 4 and 6 and the horizontal reference (horizontal plane). For example, in a kinetic posture success condition related to a kinetic posture included in an element name of "back uprise to Maltese (two seconds)", a condition that a maximum value $\theta_{Max}$ of the shoulder angle is equal to or smaller than 45° after a timing $T_1$ at which a swing is finished.

In other words, if the maximum value $\theta_{Max}$ of the shoulder angle is equal to or smaller than 45°, it is indicated that the kinetic posture success condition for the element name of "back uprise to Maltese (two seconds)" is met. Meanwhile, it is not always determined that "back uprise to Maltese (two seconds)" is successful if only the kinetic posture success condition for the shoulder angle as described with reference to FIG. 16 is met. It is determined that "back uprise to Maltese (two seconds)" is successful if other static posture success conditions and other kinetic posture success conditions associated with "back uprise to Maltese (two seconds)" are met. For example, the kinetic posture success condition includes, in addition to the shoulder angle, a horizontal angle of Maltese, a hip angle, a knee angle, an elbow angle, and the like.

The score table 156c is a table for defining the number of points that are used for the E-score related to a perfection level of an element. The E-score is determined by a point-deduction system with reference to a predetermined number of points (For example, 10 points), and the number of points to be deducted is increased with a decrease in the perfection level of an element. In the score table 156c, the number of points to be deducted is defined for each of the evaluation items of each of static postures. Further, in the score table 156c, the number of points to be deducted is defined for each of the evaluation items of each of kinetic postures.

FIG. 17 is a diagram for explaining the number of points to be deducted with respect to an evaluation item for a static posture. In FIG. 17, as one example, the number of points to be deducted with respect to a static posture name of "cross" and an evaluation item of "shoulder angle" is illustrated. The evaluation item of "shoulder angle" corresponds to the shoulder angle of the static posture success condition illustrated in FIG. 14.

As illustrated in FIG. 17, if the shoulder angle is "$0° \leq \theta < 6°$", "no deduction" is adopted. If the shoulder angle is "$6° \leq \theta < 16°$", a deduction of "0.1 (small fault)" is adopted. If the shoulder angle is "$16° \leq \theta < 31°$", a deduction of "0.3 (medium fault)" is adopted. If the shoulder angle is "$31° \leq \theta < 46°$", a deduction of "0.5 (large fault)" is adopted. If the shoulder angle is "$46° \leq \theta$", "unsuccessful element" is adopted.

FIG. 18 is a diagram for explaining the number of points to be deducted with respect to an evaluation item for a kinetic posture. In FIG. 18, as one example, the number of points to be deducted with respect to a kinetic posture name of "kinetic posture B1" and an evaluation item of "shoulder angle" is illustrated. The evaluation item of "shoulder angle" corresponds to the shoulder angle described in relation to the kinetic posture success condition illustrated in FIG. 16.

As illustrated in FIG. 18, if the shoulder angle is "$0° \leq \theta < 6°$", "no deduction" is adopted. If the shoulder angle is "$6° \leq \theta < 16°$", a deduction of "0.1 (small fault)" is adopted. If the shoulder angle is "$16° \leq \theta < 31°$", a deduction of "0.3 (medium fault)" is adopted. If the shoulder angle is "$31° \leq \theta < 46°$", a deduction of "0.5 (large fault)" is adopted. If the shoulder angle is "$46° \leq \theta$", "unsuccessful element" is adopted.

The digest video DB 157 is a table for holding a digest video of an element for which whether the reference for determination of success or failure of an element or the reference for a perfection level of the element is met is unclear.

The control unit 160 includes a registering unit 161, a first extracting unit 162, a second extracting unit 163, and an output unit 164. The control unit 160 may be realized by a central processing unit (CPU), a micro processing unit (MPU), or the like. Further, the control unit 160 may be realized by hardware wired logic, such as an application specific integrated circuit (ASIC) or a field programmable gate array (FPGA).

The registering unit 161 acquires sensor data from the 3D laser sensor 20a and registers the acquired sensor data to the sensing DB 151. The registering unit 161 associates the sensor data (a frame number and a sensor frame) with the recording ID at the time of registration of the sensor data to the sensing DB 151. The recording ID is added to, for example, the sensor data. A user may input the recording ID corresponding to the sensor data by operating the input unit 130.

The registering unit 161 acquires video data from the camera 20b and registers the acquired video data to the video DB 152. The registering unit 161 associates the video data (a frame number and a sensor frame) with the recording ID at the time of registration of the video data to the video DB 152. The recording ID is added to, for example, the video data. A user may input the recording ID corresponding to the video data by operating the input unit 130.

The first extracting unit 162 extracts an element that falls within a predetermined range from a reference for success or failure of the element (a static posture or a kinetic posture), on the basis of the sensing DB 151. Further, the first extracting unit 162 extracts an element (a static posture or a kinetic posture) that falls within a predetermined range from a reference for determination of the perfection level of the element, on the basis of the sensing DB 151. In the following descriptions, the element that falls within the predetermined range from the reference for success or failure will be appropriately described as a "first element". The element that falls within the predetermined range from the reference for determination of the perfection level will be described as a "second element".

The first extracting unit 162 performs a process of extracting pieces of positional data of each of the joints of the athlete 10 in chronological order, a process of generating 3D model data, a process of evaluating a score, and a process of extracting the first element and the second element.

First, an example of the process performed by the first extracting unit 162 to extract each piece of positional data of each of the joints of the athlete 10 in chronological order will be described. The first extracting unit 162 compares a sensing frame of the sensing DB 151 and the joint definition data 153, identifies a type of each of joints included in the frame, and identifies three-dimensional coordinates of the joints. The first extracting unit 162 registers information, in which the recording ID, the frame number, and the three-dimensional coordinate of the type of each of the joints are associated, to the joint position DB 154. The first extracting unit 162 repeatedly performs the above-described process for each of the frame numbers.

An example of the process performed by the first extracting unit 162 to generate the 3D model DB 155 will be described below. The first extracting unit 162 generates 3D model data corresponding to each of the frame numbers on the basis of the joint position DB 154. The first extracting unit 162 stores the generated 3D model data in the 3D model DB 155 in association with the recording ID and the frame number.

For example, the first extracting unit 162 generates skeleton data by connecting the three-dimensional coordinates of the respective joints stored in the joint position DB 154 on the basis of a connection relationship defined in the joint definition data 153. Further, the first extracting unit 162 generates the 3D model data by applying estimated skeleton data to a skeleton model that fits to a physical condition of the athlete 10. The first extracting unit 162 repeatedly performs the above-described process for each of the frame numbers of each of the recording IDs, and stores the recording ID, the frame number, the skeleton data, and the 3D model data in the 3D model DB 155 in an associated manner.

An example of the process performed by the first extracting unit 162 to evaluate a score will be described below. The first extracting unit 162 identifies each of postures (static postures and kinetic postures) of the athlete 10 and evaluates the D-score and the E-score, on the basis of a series of movement of joints stored in the joint position DB 154 and on the basis of the element recognition DB 156. The D-score is a score that is based on success or failure of an element in a performance of the athlete 10. The E-score is a score that is based on the perfection level of the element in the performance of the athlete 10.

First, an example of the process performed by the first extracting unit 162 to identify each of the postures of the athlete 10 will be described. The first extracting unit 162 compares the static posture success condition in the success condition table 156b (the table 170a) of the element recognition DB 156 and each of joint positions for each of the frame numbers, and if a value based on a joint position meets the static posture success condition, the first extracting unit 162 determines that a corresponding static posture is successful with respect to a corresponding frame number.

For example, the value based on the joint position corresponds to the spine angle, the hip angle, the arm angle, the elbow angle, the knee angle, the inter-knee angle, or the like described above with reference to FIG. 14.

It is assumed that, with respect to a frame number n, the spine angle is "equal to or smaller than $\theta_{A1}$" and the hip angle is "equal to or smaller than $\theta_{A2}$". Further, with respect to the frame number n, it is assumed that the arm angle is "$\theta_{A31}$ to $\theta_{A32}$ or smaller", the elbow angle is "equal to or smaller than $\theta_{A4}$", the knee angle is "equal to or larger than $\theta_{A5}$", and the inter-knee angle is "equal to or smaller than $\theta_{A6}$". In this case, the output unit 164 determines that the static posture of the static posture name of "cross" is successful because the static posture success condition is met with respect to the frame number n.

While the case related to the static posture name of "cross" has been described above, embodiments are not limited thereto. The first extracting unit 162 determines success or failure of static posture names for other static postures by comparing the static posture success condition in the success condition table 156b of the element recognition DB 156 and each of joint positions for each of the frame numbers.

Further, the first extracting unit 162 compares the kinetic posture success condition in the success condition table 156b (the table 170b) of the element recognition DB 156 and transition of each of joint positions for each of the frame numbers, and if a value based on a joint position meets the kinetic posture success condition, the first extracting unit 162 determines that a corresponding kinetic posture is successful with respect to each of corresponding frame numbers.

For example, the value based on each of the joint positions corresponds to the maximum value $\theta_{Max}$ of the shoulder angle described above with reference to FIG. 16. If, with respect to frame numbers n to n+m, the maximum value $\theta_{Max}$ of the shoulder angle is equal to or smaller than 45°, the first extracting unit 162 determines that the kinetic posture success condition for the element name of "back uprise to Maltese (two seconds)" is met.

While the case related to the kinetic posture success condition for "back uprise to Maltese (two seconds)" has been described above, embodiments are not limited thereto. The first extracting unit 162 determines success or failure of kinetic posture names for other kinetic postures by comparing the kinetic posture success condition in the success condition table 156b of the element recognition DB 156 and transition of each of joint positions for each of the frame numbers.

An example of the process performed by the first extracting unit 162 to evaluate the D-score will be described below. The first extracting unit 162, through the comparison with the success condition table 156b as described above, compares a combination of a successful static posture and a successful kinetic posture for each of the frame numbers and the success condition in the element recognition table 156a, to thereby identify a successful element name and identify a score corresponding to the identified element name. The first extracting unit 162 repeatedly performs the above-described process for each of the frame numbers, and calculates the D-score by summing up the identified scores.

An example of the process performed by the first extracting unit 162 to evaluate the E-score will be described below. The first extracting unit 162, through the comparison with the success condition table 156b as described above, compares the value based on the joint position and each of thresholds with respect to an evaluation item of a static posture that is determined as successful, to thereby identify a value of a deduction.

A deduction of the E-score with respect to the evaluation item of the shoulder angle will be described with reference to FIG. 17. If the shoulder angle is "0°≤θ<6°", the first extracting unit 162 adopts "no deduction". If the shoulder angle is "6°≤θ<16°", the first extracting unit 162 adopts a deduction of "0.1 (small fault)". If the shoulder angle is "16°≤θ<31°", the first extracting unit 162 adopts a deduction of "0.3 (medium fault)". If the shoulder angle is "31°≤θ<46°", the first extracting unit 162 adopts a deduction of "0.5 (large fault)". The first extracting unit 162 identifies a value of a deduction in the same manner for other evaluation items.

Further, the first extracting unit 162, through the comparison with the success condition table 156b as described above, compares the value based on the joint position and each of thresholds with respect to an evaluation item of a kinetic posture that is determined as successful, to thereby identify a value of a deduction.

A deduction of the E-score by adopting the maximum value of the shoulder angle as the evaluation item will be described with reference to FIG. 18. The first extracting unit 162 calculates the maximum value of the shoulder angle based on a series of transition of joint positions. If the maximum value of the shoulder angle is "0°≤θ<6°", the first extracting unit 162 adopts "no deduction". If the maximum value of the shoulder angle is "6°≤θ<16°", the first extracting unit 162 adopts a deduction of "0.1 (small fault)". If the maximum value of the shoulder angle is "16°≤θ<31°", the first extracting unit 162 adopts a deduction of "0.3 (medium fault)". If the maximum value of the shoulder angle is "31°≤θ<46°", the first extracting unit 162 adopts a deduction of "0.5 (large fault)".

The first extracting unit 162 calculates a total value of deduction by summing up the identified values of deductions and calculates the E-score by subtracting the total value of deduction from a value that is specified in advance.

An example of the process performed by the first extracting unit 162 to extract the "first element" will be described below. The first extracting unit 162 extracts, as the first element, a static posture or a kinetic posture that falls within a predetermined range from the reference for success or failure of an element. The reference for success or failure of an element corresponds to a first reference. For example, as will be described later, a limit value at which a static posture is determined as successful corresponds to the first reference.

The first extracting unit 162 compares the static posture success condition in the success condition table 156b (the table 170a) of the element recognition DB 156 and each of joint positions for each of frame numbers, and determines whether the value based on a joint position falls within the predetermined range with reference to a limit at which a static posture is determined as successful.

A process of extracting the first element by adopting the shoulder angle as the evaluation item will be described. As described above with reference to FIG. 17, if the shoulder angle is adopted as the evaluation item, a limit at which a static posture is determined as successful is "45°". Further, if an error range is set to ±5°, a predetermined range based on the reference for success or failure is set to a range of "40° to 50°". If the value of the shoulder angle based on each of the joint positions corresponding to the frame number n falls within the range of 40° to 50°, the first extracting unit 162 extracts a static posture (element) corresponding to the frame number n as the first element.

The first extracting unit 162 sets a predetermined range based on success or failure with respect to other evaluation items, and if the value based on each of the joint positions corresponding to the frame number n falls within the predetermined range, the first extracting unit 162 extracts a static posture (element) corresponding to the frame number n as the first element.

Figure 19:
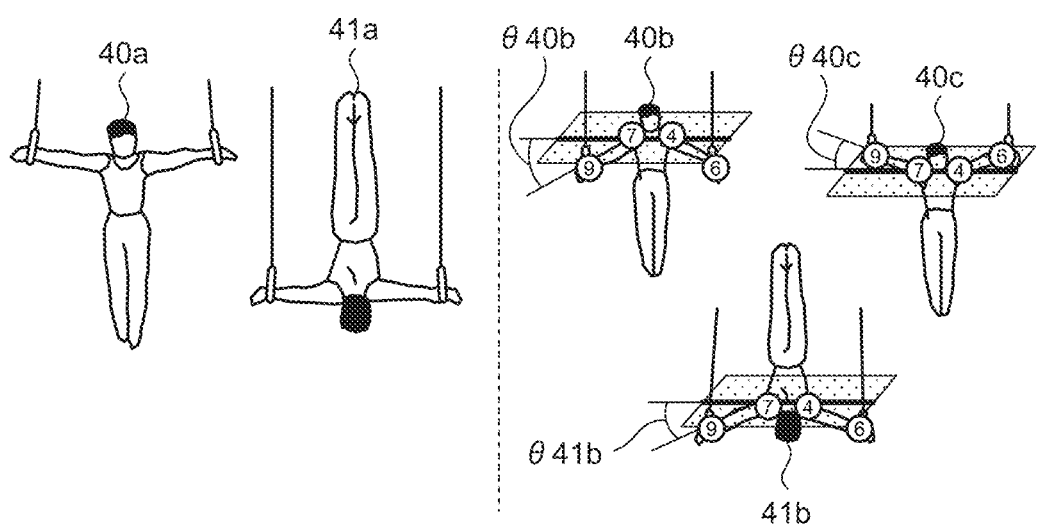
FIG. 19 is a diagram illustrating an example of postures that are extracted as first elements and postures that are not extracted as the first elements.

FIG. 19 is a diagram illustrating an example of postures that are extracted as the first elements and postures that are not extracted as the first elements. In FIG. 19, a plurality of static postures of "cross" 40a, 40b, and 40c and a plurality of static postures of "inverted cross" 41a and 41b are illustrated. For example, it is assumed that the "shoulder angle" is adopted as the evaluation item for the static posture of "cross" and the predetermined range based on the reference for success or failure is set to "40° to 50°". Further, it is assumed that the "shoulder angle" is adopted as the evaluation item of the static posture of "inverted cross" and the predetermined range based on the reference for success or failure is set to "40° to 50°".

The first extracting unit 162 does not extract the static posture of "cross" 40a as the first element because the shoulder angle is 0°. The first extraction unit extracts the static postures of "cross" 40b and 40c as the first elements if a shoulder angle θ41b of the static postures of "cross" 40b and 40c falls within the range of "40° to 50°".

The first extracting unit 162 does not extract the static posture of "inverted cross" 41a as the first element because the shoulder angle is 0°. The first extraction unit 162 extracts the static posture of "inverted cross" 41b as the first element if a shoulder angle θ41b of the static posture "inverted cross" 41b falls within the range of "40° to 50°".

The first extracting unit 162 compares the kinetic posture success condition in the success condition table 156b (the table 170b) of the element recognition DB 156 and each of joint positions corresponding to the frame numbers n to n+m, and determines whether the value based on a joint position falls within a predetermined range with reference to a limit at which a kinetic posture is determined as successful.

A process of extracting the first element by adopting the shoulder angle (the maximum value of the shoulder angle identified by a series of movement of joint positions) as the evaluation item will be described. If the shoulder angle is adopted as the evaluation item, a limit at which a kinetic posture is determined as successful is 45°. Further, if an error range is set to ±5°, a predetermined range based on the reference for success or failure is set to a range of "40° to 50°". If the maximum value of the shoulder angle based on each of the joint positions corresponding to the frame numbers n to n+m falls within the range of 40° to 50°, the first extracting unit 162 extracts kinetic postures (elements) corresponding to the frame numbers n to n+m as the first elements. Meanwhile, the first extracting unit 162 may extract, as the first element, a posture at a timing at which the shoulder angle falls within the range of 40° to 50°.

The first extracting unit 162 sets a predetermined range based on success or failure with respect to other evaluation items, and if the value based on each of the joint positions corresponding to the frame numbers n to n+m falls within the predetermined range, the first extracting unit 162 extracts kinetic postures (elements) corresponding to the frame numbers n to n+m as the first elements.

The first extracting unit 162 outputs, to the second extracting unit 163, information on the frame number corresponding to the timing at which the first element is extracted. Further, the first extracting unit 162 outputs, to the second extracting unit 163, information on the evaluation item that falls within the predetermined range based on success or failure of an element at the time of determination of the first element. For example, if an element is determined as the first element because a value of the evaluation item of "shoulder angle" falls within the predetermined range, the evaluation item of "shoulder angle" is output to the second extracting unit 163 in association with information on a frame number corresponding to the timing at which the first element is extracted.

An example of the process performed by the first extracting unit 162 to extract the "second element" will be described below. The first extracting unit 162 extracts, as the second element, a static posture or a kinetic posture that falls within a predetermined range from the reference for determination of the perfection level of an element. The reference for determination of the perfection level of an element corresponds to a second reference. A plurality of second references are present in gymnastics. For example, the second reference includes a reference for no deduction, a reference for a deduction of 0.1, a reference for a deduction of 0.3, a reference for a deduction of 0.5, and the like.

For example, the first extracting unit 162 compares the score table 156c of the element recognition DB 156 and each of joint positions for each of the frame numbers, and determines whether a value falls within a predetermined range from a limit at which a deduction is not made, where the limit is identified by the value based on a joint position.

A process of extracting the second element by adopting the shoulder angle as the evaluation item will be described with reference to FIG. 17. If the shoulder angle is adopted as the evaluation item, a limit at which a deduction is not made is "6°". Further, if an error range is set to ±5°, a predetermined range based on the reference for evaluation of the perfection level is set to a range of "1° to 11°". If the value of the shoulder angle based on each of the joint positions corresponding to the frame number n falls within the range of "1° to 11°", the first extracting unit 162 extracts a static posture (element) corresponding to the frame number n as the second element.

A process of extracting the second element by adopting the shoulder angle (the maximum value of the shoulder angle identified by a series of movement of a joint positions) as the evaluation item will be described with reference to FIG. 18. If the shoulder angle is adopted as the evaluation item, a limit at which a deduction is not made is "6°". Further, if an error range is set to ±5°, a predetermined range based on the reference for evaluation of the perfection level is set to a range of "1° to 11°". If the shoulder angle based on each of the joint positions corresponding to the frame numbers n to n+m falls within the range of "1° to 11°", the first extracting unit 162 extracts kinetic postures (elements) corresponding to the frame numbers n to n+m as the second elements.

Figure 20:
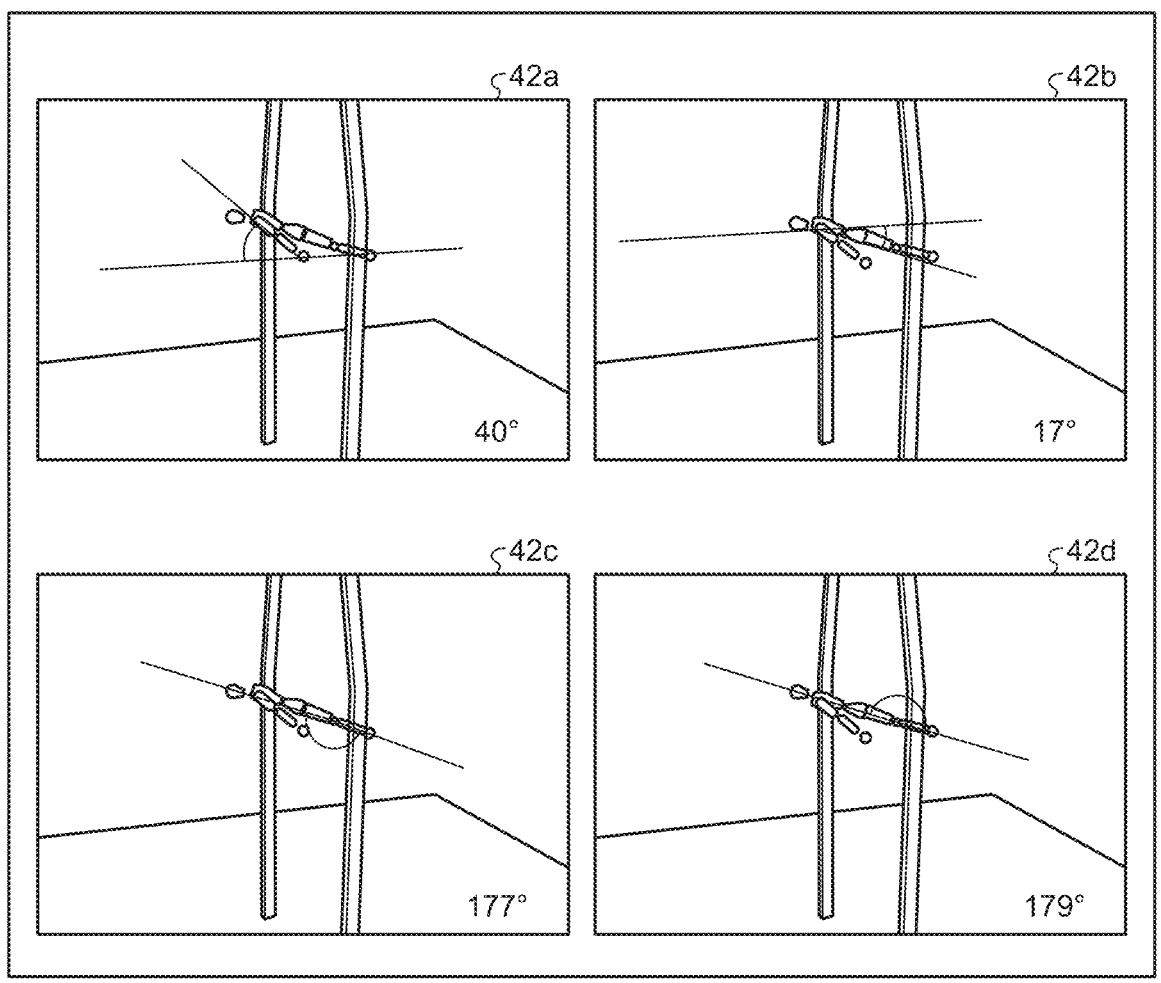
FIG. 20 is a diagram illustrating an example of postures that are extracted as second elements and postures that are not extracted as the second elements.

FIG. 20 is a diagram illustrating an example of postures that are extracted as the second elements and postures that are not extracted as the second elements. The postures in FIG. 20 are examples of postures corresponding to a certain frame number among the kinetic postures corresponding to the frame numbers n to n+m. Each of frames 42a to 42d represented by 3D model data is illustrated to explain deductions based on different evaluation items with respect to the same posture.

The frame 42a is for explaining a deduction in a case where the shoulder angle in the Planche is adopted as the evaluation item. The shoulder angle corresponds to the shoulder angle described above with reference to FIG. 16. For example, in the Maltese included in kinetic postures, a position needs to be held at a ring height, and a value of a deduction increases in accordance with a degree of deviation from the shoulder angle of 0°. If it is assumed that the shoulder angle of the posture illustrated in the frame 42a is 40°, as illustrated in FIG. 18, a deduction for the posture in the frame 42a corresponds to a "large fault" and does not fall within the predetermined range based on the reference for evaluation of the perfection level.

The frame 42b is for explaining a deduction in a case where a horizontal angle of the Planche is adopted as the evaluation item. For example, the horizontal angle is an angle between a straight line that passes through the joints assigned with the numbers 0 and 2 and the horizontal reference. In the Planche included in kinetic postures, a body needs to be held horizontally at a height of a shoulder position, and a value of a deduction increases in accordance with a degree of deviation from the horizontal angle of 0°. It is assumed that the horizontal angle in the frame 42b is 17° and a deduction for this angle is defined as a "medium fault". In this case, the angle does not fall within the predetermined range based on the reference for evaluation of the perfection level.

The frame 42c is for explaining a deduction in a case where a hip angle in the Planche is adopted as the evaluation item. The hip angle is an angle of a hip of the athlete 10 and is calculated on the basis of the joints assigned with the numbers 0, 2, 4, 7, 10, 11, 14, 15, and the like. In the Planche included in kinetic postures, a layout posture needs to be realized, and a value of a deduction increases in accordance with a degree of deviation from the hip angle of 180°. It is assumed that the hip angle in the frame 42c is 177° and a deduction for this angle is defined as "no deduction". As for the posture illustrated in the frame 42c, the degree of deviation from the ideal hip angle of 180° is 3° and the angle falls within a predetermined range (175° to 185°) based on the reference for evaluation of the perfection level.

The frame 42d indicates a knee angle in the Planche. The knee angle is an angle of knees of the athlete 10 and is calculated based on the joints assigned with the numbers 10, 11, 12, 14, 15, 16, and the like. In the Planche included in kinetic postures, a layout posture needs to be realized, and the number of deductions increases in accordance with a degree of deviation from the knee angle of 180°. It is assumed that the knee angle in the frame 42d is 179° and a deduction for this angle is defined as "no deduction". As for the posture illustrated in the frame 42d, the degree of deviation from the ideal hip angle of 180° is 1° and the angle falls within the predetermined range (175° to 185°) based on the reference for evaluation of the perfection level.

If the value of any of the different evaluation items for a posture corresponding to a certain frame number among kinetic postures corresponding to the frame numbers n to n+m falls within the predetermined range that is based on the reference for evaluation of the perfection level, the first extracting unit 162 extracts the kinetic postures corresponding to the frame numbers n to n+m as the second elements. In the example illustrated in FIG. 20, the values of the evaluation items of the "hip angle in the Planche" and the "knee angle in the Planche" fall within the predetermined ranges based on the references for evaluation of the perfection level. Therefore, the first extracting unit 162 extracts the kinetic postures corresponding to the frame numbers n to n+m as the second elements.

The first extracting unit 162 outputs, to the second extracting unit 163, information on the frame number corresponding to the timing at which the second element is extracted. Further, the first extracting unit 162 outputs, to the second extracting unit 163, information on the evaluation item that falls within the predetermined range based on the perfection level at the time of determination of the second element. For example, if an element is determined as the second element because a value of the evaluation item of "shoulder angle" falls within the predetermined range, the evaluation item of "shoulder angle" is output to the second extracting unit 163 in association with information on a frame number corresponding to the timing at which the second element is extracted.

In the example as described above, it is explained that the reference for no deduction is adopted as the second reference; however, the first extracting unit 162 may set, as the second reference, a reference that is selected by a user from among a plurality of references, and extract the second element. For example, the first extracting unit 162 accepts selection of any of a reference for no deduction, a reference for a deduction of 0.1, a reference for a deduction of 0.3, and a reference for a deduction of 0.5, and sets the accepted reference as the second reference. For example, a process performed by the first extracting unit 162 in a case where the reference for a deduction of 0.1 is selected will be described.

A process of extracting the second element by adopting the shoulder angle as the evaluation item will be described with reference to FIG. 17. If the shoulder angle is adopted as the evaluation item, limits at which the deduction of 0.1 is not made are "6°" and "16°". Further, if an error range is set to ±5°, predetermined ranges based on the reference for evaluation of the perfection level are set to ranges of "1° to 11°" and "11° to 21°". If the value of the shoulder angle based on each of the joint positions corresponding to the frame number n falls within the range of "1° to 11°", the first extracting unit 162 extracts a static posture (element) corresponding to the frame number n as the second element. Further, if the value of the shoulder angle based on each of the joint positions corresponding to the frame number n falls within the range of "11° to 21°", the first extracting unit 162 extracts a static posture (element) corresponding to the frame number n as the second element.

Referring back to explanation of FIG. 5, the second extracting unit 163 is a processing unit that extracts a digest video of a portion corresponding to the first element or the second element. The second extracting unit 163 registers information on the extracted digest video to the digest video DB 157.

When receiving information on the frame number n corresponding to the timing at which the first element (static posture) is extracted, the second extracting unit 163 acquires N video frames before and after the received frame number n from the video DB 152, and generates a digest video from each of the acquired video frames. Alternatively, the second extracting unit 163 acquires N pieces of 3D model data before and after the received frame number n from the 3D model DB 155, and generates a digest video from each piece of the acquired 3D model data.

When receiving information on the frame numbers n to n+m corresponding to the timing at which the first elements (kinetic postures) are extracted, the second extracting unit 163 acquires video frames corresponding to the received frame numbers n to n+m from the video DB 152, and generates a digest video from each of the acquired video frames. Alternatively, the second extracting unit 163 acquires pieces of 3D model data corresponding to the received frame number n+m from the 3D model DB 155, and generates a digest video from each piece of the acquired 3D model data.

Still alternatively, the second extracting unit 163 may generate a digest video from a video frame and 3D model data corresponding to each of frame numbers from a timing of start of the first element (kinetic posture) to the end of the first element. The second extracting unit 163 may generate a digest video from a video frame and 3D model data corresponding to each of frame numbers from a timing of start of the first element to a lapse of a predetermined seconds.

The second extracting unit 163 registers information, in which the first element name, the evaluation item based on which the first element name has been extracted, and the digest video are associated, to the digest video DB 157.

When receiving information on the frame number n corresponding to the timing at which the second element (static posture) is extracted, the second extracting unit 163 acquires N video frames before and after the received frame number n from the video DB 152, and generates a digest video from each of the video frames. Alternatively, the second extracting unit 163 acquires N pieces of 3D model data before and after the received frame number n from the 3D model DB 155, and generates a digest video from each piece of acquired 3D model data.

When receiving information on the frame numbers n to n+m corresponding to the timing at which the second elements (kinetic postures) are extracted, the second extracting unit 163 acquires video frames corresponding to the received frame numbers n to n+m from the video DB 152, and generates a digest video from each of the acquired video frames. Alternatively, the second extracting unit 163 acquires pieces of 3D model data corresponding to the received frame number n+m from the 3D model DB 155, and generates a digest video from each piece of the acquired 3D model data.

The second extracting unit 163 registers information, in which the second element name, the evaluation item based on which the second element name has been extracted, and the digest video are associated, to the digest video DB 157.

FIG. 21 is a diagram illustrating an example of a data structure of a digest video DB according to the first embodiment. As illustrated in FIG. 21, the digest video DB 157 associates an element name, an evaluation item, a first digest video, and a second digest video. The element name indicates names of a static posture and a kinetic posture corresponding to the first element and the second element. The evaluation item indicates evaluation items based on which the first element and the second element have been extracted. The first digest video is a digest video that is generated from video frames in the video DB 152. The second digest video is a digest video that is generated from pieces of 3D model data in the 3D model DB 155.

The output unit 164 is a processing unit that outputs and displays, onto the display unit 140, a video of a portion corresponding to the first element or the second element on the basis of the digest video DB 157. For example, the output unit 164 generates information on a display screen on the basis of the digest video DB 157, and outputs the generated information on the display screen to the display unit 140.

Figure 22:
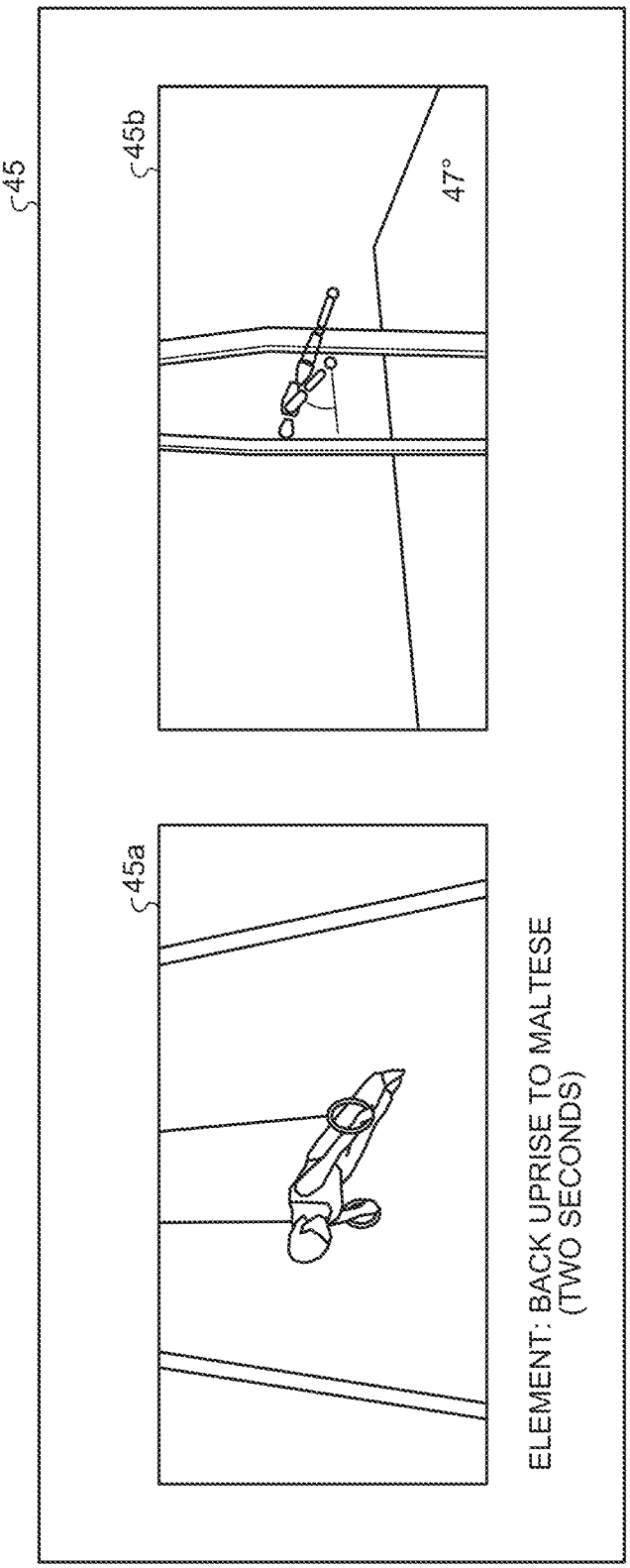
FIG. 22 is a diagram illustrating an example of a display screen according to the first embodiment.

FIG. 22 is a diagram illustrating an example of the display screen according to the first embodiment. As illustrated in FIG. 22, the display screen 45 includes a display region 45a and a display region 45b. The display region 45a is a region for displaying the first digest video that is generated from the video frame. The display region 45b is a region for displaying a video that is captured from a predetermined viewpoint (virtual viewpoint) with respect to the 3D model data included in the second digest video.

When displaying the second digest video in the display region 45b, the output unit 164 generates a video that is captured in a certain direction, in which a portion of a 3D model of the athlete corresponding to the reference for determination of success or failure and a portion of a 3D model of the athlete corresponding to the reference for determination of the perfection level are viewable, and displays the generated video in the display region 45b. For example, the output unit 164 holds a table, which is stored in the digest video DB 157 and in which the evaluation items based on which the first element and the second element have been extracted and an optimal viewpoint and an optimal direction for displaying portions of the 3D model of the athlete corresponding to the evaluation items are associated. The output unit 164 identifies the viewpoint and the direction by comparing the held table and the evaluation items associated with the second digest video, and displays, in the display region 45b, a video that is obtained by capturing the 3D model data of the second digest video at the identified viewpoint and in the identified direction.

Here, upon receiving the sensor data from the 3D laser sensor 20a, each of the processing units 161 to 164 of the information processing apparatus 100 performs processes in real time. With this configuration, when the athlete 10 gives a performance in a competition site, a referee or the like is able to check, in real time, a portion for which a score may be controversial before actually determining a score. Further, it is possible to display a portion for which a score may be controversial to viewers before a scoring result is provided or make a suggestion to a broadcaster side about a portion for which commentary may be requested.

Figure 23:
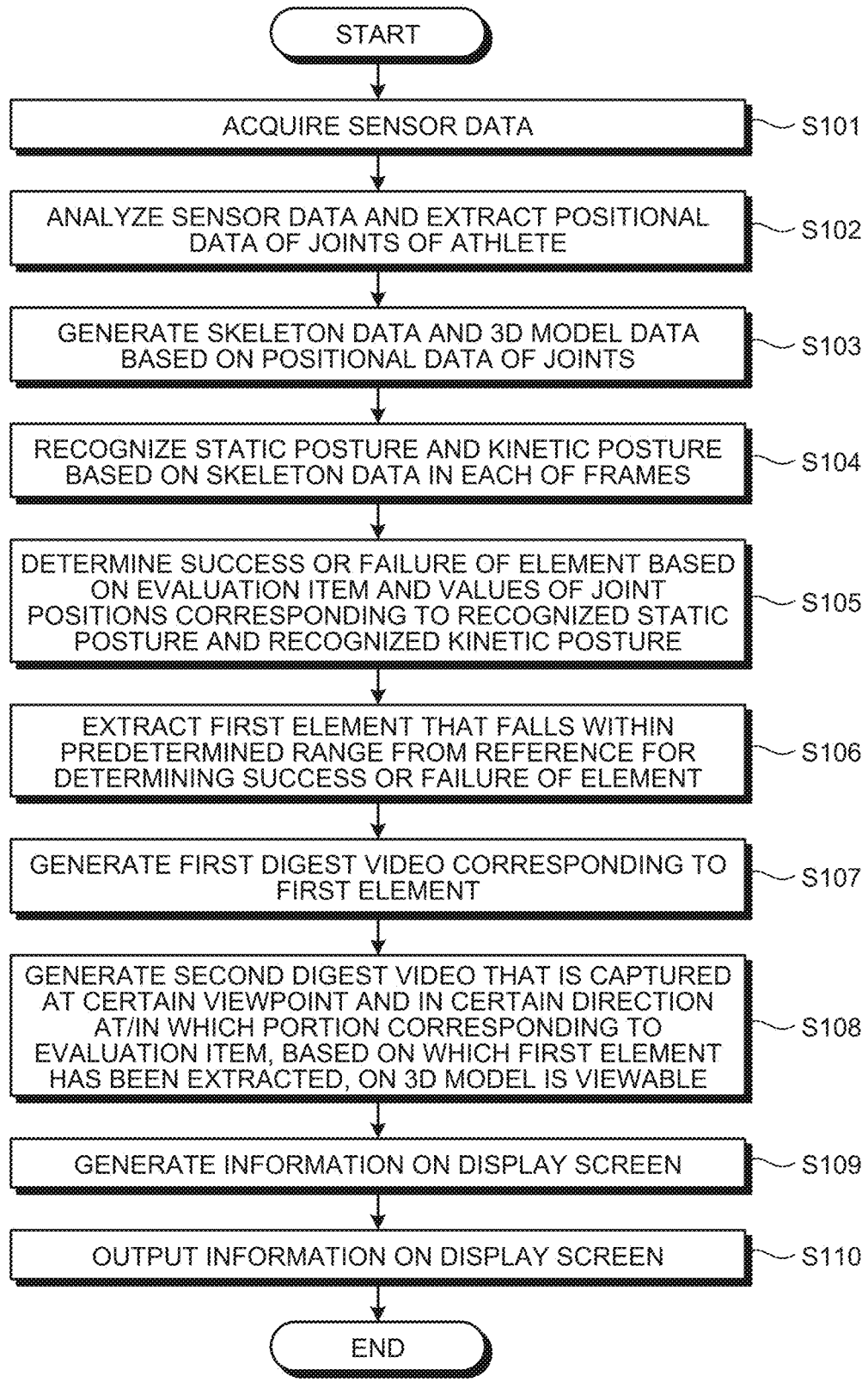
FIG. 23 is a first flowchart illustrating the flow of a process performed by the information processing apparatus according to the first embodiment.

An example of the flow of a process performed by the information processing apparatus 100 according to the first embodiment will be described below. FIG. 23 is a first flowchart illustrating the flow of the process performed by the information processing apparatus according to the first embodiment. As illustrated in FIG. 23, the registering unit 161 of the information processing apparatus 100 acquires sensor data from the 3D laser sensor 20a (Step S101). The first extracting unit 162 of the information processing apparatus 100 analyzes the sensor data and extracts positional data of joints of the athlete 10 (Step S102).

The first extracting unit 162 generates skeleton data and 3D model data on the basis of the positional data of the joints (Step S103). The first extracting unit 162 recognizes a static posture and a kinetic posture on the basis of the skeleton data (joint position) in each of frames (Step S104).

The first extracting unit 162 determines success or failure of an element on the basis of the evaluation item and values of joint positions corresponding to the recognized static posture and the recognized kinetic posture (Step S105). The first extracting unit 162 extracts a first element that falls within a predetermined range from the reference for determination of the success or failure of the element (Step S106).

The second extracting unit 163 of the information processing apparatus 100 generates a first digest video corresponding to the first element (Step S107). The output unit 164 of the information processing apparatus 100 generates a second digest video that is captured at a certain viewpoint and in a certain direction at/in which a portion corresponding to the evaluation item, based on which the first element has been extracted, on the 3D model is viewable (Step S108).

The output unit 164 generates information on a display screen (Step S109), and outputs the information on the display screen to the display unit 140 (Step S110).

Figure 24:
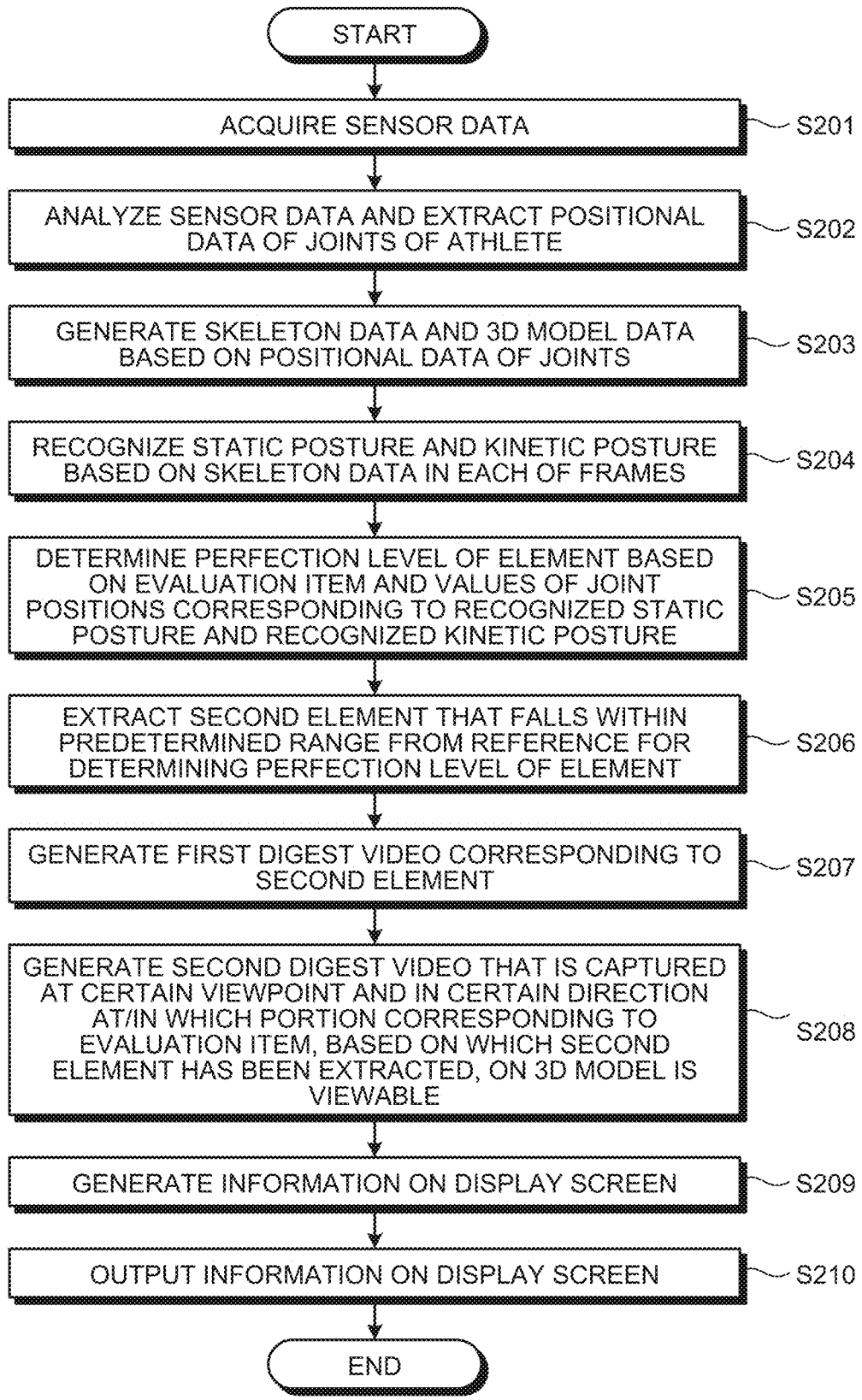
FIG. 24 is a second flowchart illustrating the flow of the process performed by the information processing apparatus according to the first embodiment.

FIG. 24 is a second flowchart illustrating the flow of the process performed by the information processing apparatus according to the first embodiment. As illustrated in FIG. 24, the registering unit 161 of the information processing apparatus 100 acquires sensor data from the 3D laser sensor 20a (Step S201). The first extracting unit 162 of the information processing apparatus 100 analyzes the sensor data and extracts positional data of joints of the athlete 10 (Step S202).

The first extracting unit 162 generates skeleton data and 3D model data on the basis of the positional data of the joints (Step S203). The first extracting unit 162 recognizes a static posture and a kinetic posture on the basis of the skeleton data (joint position) in each of frames (Step S204).

The first extracting unit 162 determines a perfection level of an element on the basis of the evaluation item and values of joint positions corresponding to the recognized static posture and the recognized kinetic posture (Step S205). The first extracting unit 162 extracts a second element that falls within a predetermined range from the reference for determination of the perfection level of the element (Step S206).

The second extracting unit 163 of the information processing apparatus 100 generates a first digest video corresponding to the second element (Step S207). The output unit 164 of the information processing apparatus 100 generates a second digest video that is captured at a certain viewpoint and in a certain direction at/in which a portion corresponding to the evaluation item, based on which the second element has been extracted, on the 3D model is viewable (Step S208).

The output unit 164 generates information on a display screen (Step S209), and outputs the information on the display screen to the display unit 140 (Step S210).

In FIG. 23 and FIG. 24, as one example, the processes for extracting the first element and the second element are explained separately, but embodiments are not limited to this example. The information processing apparatus 100 may perform the processes of extracting the first element and the second element in parallel. Further, the information processing apparatus 100 may extract the second element after extracting the first element, or may extract the first element after extracting the second element.

Effects of the information processing apparatus 100 according to the first embodiment will be described below. When whether an element performed by the athlete 10 meets the reference for determination of success or failure of an element or the reference for determination of the perfection level is unclear, the information processing apparatus 100 performs the process of extracting and outputting a video of the element. With this configuration, it is possible to extract a video based on the score from among a series of videos of performance related to a scoring competition.

For example, to assist scoring performed by a referee in a scoring competition, it is effective to extract a portion for which a score may be controversial and request the referee to focus on the portion in determination. Further, in training for the scoring competition, the athlete 10 needs to make improvement to give a clear performance such that a score does not become controversial on a real stage; therefore, it is effective to extract a portion for which a score may be controversial even at the time of training and make use of the extracted portion in the training. Furthermore, viewers of the scoring competition are able to enjoy resources of a scoring competition by listening to commentary while viewing a replay video of the portion for which the score may be controversial as a replay video that is provided until a scoring result is given.

In contrast, in the conventional technology, when a partial video is extracted from a series of videos, it is possible to extract a specific play, but it is impossible to extract a portion for which a score may be controversial from a series of videos while reflecting a scoring result in real time in a scoring competition.

For example, in a usage scene at the time of commentary in television broadcasting, a commentator is able to repeatedly check a portion for which a score may be controversial by referring to the digest video output from the information processing apparatus 100, so that the commentator is able to focus on the portion for which the score may be controversial in his/her commentary. Therefore, viewers of the scoring competition are able to enjoy resources of the scoring competition by listening to the commentary while viewing a replay video of the portion for which the score may be controversial as a replay video that is provided until a scoring result is given.

In a usage scene in training, the athlete 10 is able to recognize a portion for which a score may be controversial in a current performance by referring to the digest video output from the information processing apparatus 100. Therefore, the athlete 10 is able to extract the portion for which the score may be controversial even at the time of training and make use of the extracted portion in the training.

In a usage scene for a support system for a referee, the information processing apparatus 100 is able to notify the referee of a digest video of a portion that is closely related to a score (for which the score may be controversial), and therefore is able to request the referee to focus on the portion in determination or request an advanced referee to determine the portion for which the score may be controversial.

Furthermore, the information processing apparatus 100 according to the first embodiment generates and displays a digest video that is captured at a certain viewpoint and a certain angle at which the portion for which the score may be controversial (portion corresponding to the evaluation item) is clarified. Therefore, the referee or the like is able to clearly observe the portion for which the score may be controversial, so that it is possible to determine a score more appropriately.

Meanwhile, when extracting the second element, the first extracting unit 162 of the information processing apparatus 100 according to the first embodiment extracts, as the second element, a static posture or a kinetic posture that falls within the predetermined range from the reference for determination of the perfection level of the element, but embodiments are not limited to this example.

For example, the first extracting unit 162 of the information processing apparatus 100 may extract, as the second element, an element that is equal to or exceeds a predetermined reference among a plurality of references for determination of the perfection level of the element. Specifically, the first extracting unit 162 determines whether a value of a deduction that is identified by the value based on a joint position exceeds a predetermined value by comparing the score table 156c of the element recognition DB 156 and each of the joint positions for each of the frame numbers. For example, if it is assumed that the predetermined value is set to a deduction of "0.5 (large fault)", the first extracting unit 162 extracts, as the second element, a static posture or a kinetic posture for which a value of a deduction that is identified by the value based on a joint position is equal to or larger than the deduction of "0.5".

Further, if the number of static postures or kinetic postures (the number of the second elements) for which deductions are equal to or larger than the deduction of "0.5 (large fault)" is smaller than a predetermined value, the first extracting unit 162 extracts, as the second element, a static posture or a kinetic posture for which a deduction is equal to or larger than a deduction of "0.3 (medium fault)". Therefore, it is possible to display a predetermined number or more of digest videos that are referred to when the E-score is determined, so that it is possible to check whether the determination made by the referee is appropriate, independently of a large fault or the like.

Second Embodiment

Figure 25:
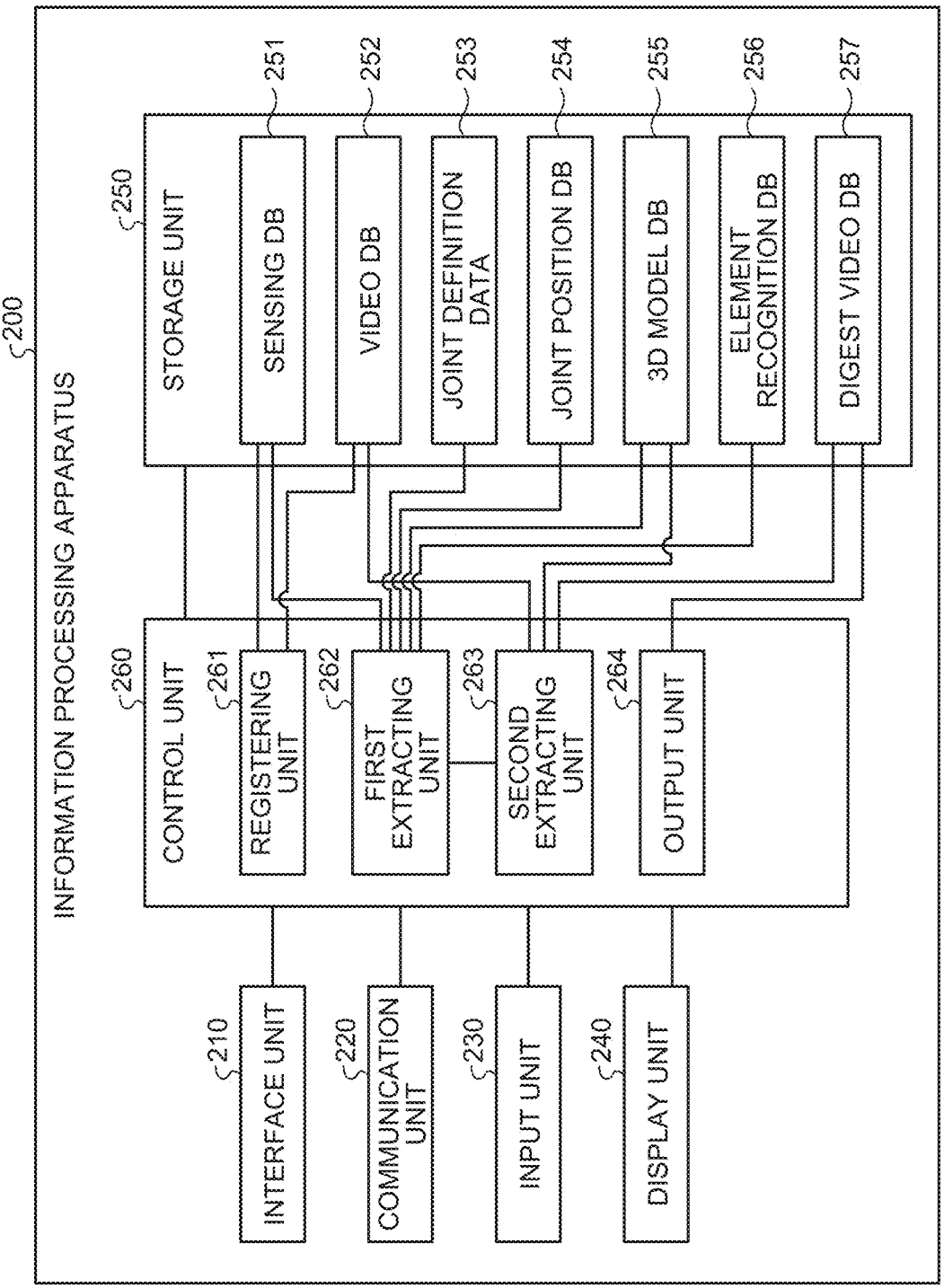
FIG. 25 is a functional block diagram illustrating a configuration of an information processing apparatus according to the second embodiment.

An information processing apparatus according to a second embodiment will be described below. FIG. 25 is a functional block diagram illustrating a configuration of the information processing apparatus according to the second embodiment. An information processing apparatus 200 is connected to the 3D laser sensor 20a and the camera 20b similarly to the information processing apparatus 100 of the first embodiment, although not illustrated in the drawings. Explanation of the 3D laser sensor 20a and the camera 20b are the same as those of the first embodiment.

As illustrated in FIG. 25, the information processing apparatus 200 includes an interface unit 210, a communication unit 220, an input unit 230, a display unit 240, a storage unit 250, and a control unit 260.

Explanation of the interface unit 210, the communication unit 220, the input unit 230, and the display unit 240 are the same as the explanation of the interface unit 110, the communication unit 120, the input unit 130, and the display unit 140 described above with reference to FIG. 5.

The storage unit 250 includes a sensing DB 251, a video DB 252, a joint definition data 253, a joint position DB 254, a 3D model DB 255, an element recognition DB 256, and a digest video DB 257. The storage unit 250 corresponds to a semiconductor memory device, such as a RAM, a ROM, or a flash memory, or a storage device, such as an HDD.

The sensing DB 251 is a DB for storing sensor data acquired from the 3D laser sensor 20a. A data structure of the sensing DB 251 is the same as the data structure of the sensing DB 151 described above with reference to FIG. 6.

The video DB 252 is a DB for storing video data acquired from the camera 20b. A data structure of the video DB 252 is the same as the data structure of the video DB 152 described above with reference to FIG. 7.

The joint definition data 253 is for defining each of joint positions of the athlete (the athlete 10). Explanation of the joint definition data 253 is the same as the explanation of the joint definition data 153 described above with reference to FIG. 8.

The joint position DB 254 is positional data of each of the joints of the athlete 10, where the positional data is generated based on the sensor data of the 3D laser sensor 20a. A data structure of the joint position DB 254 is the same as the data structure of the joint position DB 154 described above with reference to FIG. 9.

The 3D model DB 255 is a database for storing information on a 3D model of the athlete 10, where the 3D model data is generated based on the sensor data. Explanation of a data structure of the 3D model DB 255 is the same as the explanation of the data structure of the 3D model DB 155 described above with reference to FIG. 10.

Figure 26:
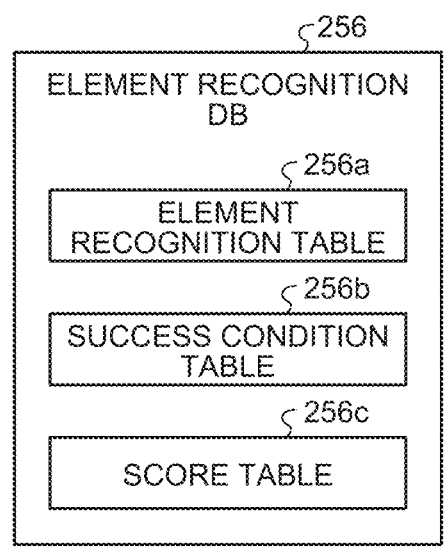
FIG. 26 is a diagram illustrating an example of a data structure of an element recognition DB according to the second embodiment.

The element recognition DB 256 is a database that is used to recognize elements (static postures and kinetic postures) included in a performance given by the athlete 10. FIG. 26 is a diagram illustrating an example of a data structure of the element recognition DB according to the second embodiment. As illustrated in FIG. 26, the element recognition DB 256 includes an element recognition table 256a, a success condition table 256b, and a score table 256c.

The element recognition table 256a is a table for holding various kinds of information for recognizing elements. Explanation of a data structure of the element recognition table 256a is the same as the explanation of the data structure of the element recognition table 156a described above with reference to FIG. 12.

The success condition table 256b includes the table 170a and the table 170b, similarly to the success condition table 156b described above with reference to FIG. 13 in the first embodiment. The table 170a associates a static posture name and a static posture success condition. The static posture name indicates a name for uniquely identifying a static posture. The static posture success condition indicates a condition for success of the static posture. The table 170b associates a kinetic posture name and a kinetic posture success condition. The kinetic posture name indicates a name for uniquely identifying a kinetic posture. The kinetic posture success condition indicates a condition for success of the kinetic posture.

The score table 256c is a table for defining a number of points that are used for the E-score related to a perfection level of an element. The E-score is determined by a point-deduction system with reference to a predetermined number of points (for example, 10 points), and the number of points to be deducted increases with a decrease in the perfection level of an element. In the score table 256c, the number of points to be deducted is defined for each of the evaluation items of each of static postures. Further, in the score table 256c, the number of points to be deducted is defined for each of the evaluation items of each of kinetic postures.

The digest video DB 257 is a table for holding a digest video of an element for which whether the reference for determination of success or failure of an element or the reference for determination of the perfection level of the element is met is unclear.

The control unit 260 includes a registering unit 261, a first extracting unit 262, a second extracting unit 263, and an output unit 264. The control unit 260 is realized by a CPU, an MPU, or the like. Further, the control unit 260 may be realized by hardware wired logic, such as an ASIC or an FPGA.

The registering unit 261 acquires sensor data from the 3D laser sensor 20a and registers the acquired sensor data to the sensing DB 251. The registering unit 261 associates the sensor data (a frame number and a sensor frame) with the recording ID at the time of registration of the sensor data to the sensing DB 251. The recording ID is added to, for example, the sensor data. A user may input the recording ID corresponding to the sensor data by operating the input unit 230.

The registering unit 261 acquires video data from the camera 20b and registers the acquired video data to the video DB 252. The registering unit 261 associates the video data (a frame number and a sensor frame) with the recording ID at the time of registration of the video data to the video DB 252. The recording ID is added to, for example, the video data. A user may input the recording ID corresponding to the video data by operating the input unit 230.

The first extracting unit 262 extracts an element (a static posture or a kinetic posture), which is a static posture or a kinetic posture included in an element at a predetermined difficultly level or higher and for which a result of determination of success or failure indicates success, on the basis of the sensing DB 251. In the following description, the element (the static posture or the kinetic posture), which is a static posture or a kinetic posture included in an element at a predetermined difficultly level or higher and for which a result of determination of success or failure indicates success, is described as a "third element".

The second extracting unit 263 extracts an element (a static posture or a kinetic posture), which is a static posture or a kinetic posture included in an element at a predetermined difficulty level or higher and for which a deduction is larger than a threshold in a result of determination of the perfection level, on the basis of the sensing DB 251. In the following description, the element (the static posture or the kinetic posture), which is a static posture or a kinetic posture included in an element at a predetermined difficulty level or higher and for which a deduction is larger than the threshold in the result of determination of the perfection level, is described as a "fourth element".

The first extracting unit 262 performs a process of extracting pieces of positional data of each of the joints of the athlete 10 in chronological order, a process of generating 3D model data, a process of evaluating a score, and a process of extracting the third element and the fourth element. Here, the process of extracting pieces of positional data of each of the joints of the athlete 10, the process of generating the 3D model data, and the process of evaluating the score performed by the first extracting unit 262 are the same as the processes performed by the first extracting unit 162 described in the first embodiment.

An example of the process performed by the first extracting unit 262 to extract the "third element" will be described. The first extracting unit 262 performs the process of evaluating the score. The first extracting unit 262 identifies a name of a successful element and a difficulty level of the element by comparing a combination of a successful static posture and a successful kinetic posture in each of the frame numbers and the success condition in the element recognition table 256a. If the identified difficulty level of the element is equal to or higher than a threshold, the first extracting unit 262 extracts, as the third elements, a static posture and a kinetic posture included in the successful element.

For example, assuming that the threshold for the difficulty level is "D", the first extracting unit 262 extracts, as the third elements, a static posture and a kinetic posture included in a successful element when the difficulty level of the successful element is equal to or higher than the difficulty level of "D". For example, the process performed by the first extracting unit 262 will be described with reference to FIG. 12. Here, as one example, it is assumed that the element with the element name of "muscle-up transition from hang" is successful in the frame numbers n to n+m. Further, it is assumed that the element with the element name of "back uprise to the Maltese (two seconds)" is successful in the frame numbers n+m to n+1.

Here, the difficulty level of the element with the element name of "muscle-up transition from hang" is "A" and lower than the threshold "D". Therefore, the first extracting unit 262 prevents static postures and kinetic postures that correspond to the element with the element name of "muscle-up transition from hang" and that are included in the frame numbers n to n+m from being extracted as the third elements.

In contrast, the difficulty level of the element with the element name of "back uprise to the Maltese (two seconds)" is "E" and higher than the threshold "D". Therefore, the first extracting unit 262 extracts, as the third elements, static postures and moving postures that correspond to the element with the element name of "back uprise to the Maltese (two seconds)" and that are included in the frame numbers n to n+m.

The first extracting unit 262 outputs, to the second extracting unit 263, information on the frame number corresponding to the timing at which the third element is extracted.

An example of the process performed by the first extracting unit 262 to extract the "fourth element" will be described below. The first extracting unit 262 performs the process of evaluating the score, similarly to the first extracting unit 162 of the first embodiment. The first extracting unit 262 identifies a name of a successful element and a difficulty level of the element by comparing a combination of a successful static posture or a successful kinetic posture in each of the frame numbers and the success condition in the element recognition table 256*a*. If the identified difficulty level of the element is equal to or higher than a threshold, the first extracting unit 262 extracts, as the fourth element, an element for which a deduction related to the element (a static posture and a kinetic posture) is equal to or larger than a threshold with respect to static postures and kinetic postures included in the successful element.

The process performed by the first extracting unit 262 to identify an element for which the difficulty level is equal to or higher than the threshold among successful element names and successful elements is the same as the process of extracting the third element as described above.

A process performed by the first extracting unit 262 to extract the fourth element by adopting the "shoulder angle" as the evaluation item of a static posture that corresponds to the frame number n and that is included in an element for which the difficulty level is equal to or higher than the threshold will be described with reference to FIG. 17. For example, if the value based on a joint position falls within a range of "31° to 45°" with respect to the "shoulder angle" as the evaluation item of the static posture corresponding to the frame number n, a deduction of "0.5 (large fault)" is adopted and the deduction is equal to or larger than the threshold. In this case, the first extracting unit 262 extracts the static posture included in the frame number n as the fourth element.

In contrast, if the value based on the joint position is smaller than "31°" with respect to the "shoulder angle" as the evaluation item of the static posture corresponding to the frame number n, a deduction of "0.3 (medium fault)", which is smaller than the threshold, is adopted. In this case, the first extracting unit 262 prevents the static posture included in the frame number n from being extracted as the fourth element.

A process performed by the first extracting unit 262 to extract the fourth element by adopting the "shoulder angle" as the evaluation item of kinetic postures corresponding to the frame numbers n to n+m included in an element for which the difficulty level is equal to or higher than the threshold will be described with reference to FIG. 18. For example, if the value based on a joint position falls within a range of "31° to 45°" with respect to the "shoulder angle" as the evaluation item of the kinetic postures corresponding to the frame numbers n to n+m, a deduction of "0.5 (large fault)" is adopted and the deduction is equal to or larger than the threshold. In this case, the first extracting unit 262 extracts the kinetic postures included in the frame numbers n to n+m as the fourth elements.

In contrast, if the value based on the joint position is smaller than "31°" with respect to the "shoulder angle" as the evaluation item of the kinetic postures corresponding to the frame numbers n to n+m, a deduction of "0.3 (medium fault)", which is smaller than the threshold, is adopted. In this case, the first extracting unit 262 prevents the kinetic postures included in the frame numbers n to n+m from being extracted as the fourth elements.

The first extracting unit 262 outputs, to the second extracting unit 263, information on the frame number corresponding to the timing at which the fourth element is extracted. Further, the first extracting unit 262 outputs, to the second extracting unit 263, information on the evaluation item for which the value of the deduction used for determination of the fourth element is equal to or larger than the threshold. For example, if the deduction related to the evaluation item of "shoulder angle" is equal to or larger than the threshold, and if an element is determined as the fourth element, the evaluation item of "shoulder angle" is output to the second extracting unit 263 in association with information on the frame number corresponding to the timing at which the fourth element is extracted.

Referring back to explanation of FIG. 25, the second extracting unit 263 is a processing unit that extracts a digest video of a portion corresponding to the third element or the fourth element. The second extracting unit 263 registers information on the extracted digest video to the digest video DB 257.

When receiving information on the frame number n corresponding to the timing at which the third element (static posture) is extracted, the second extracting unit 263 acquires N video frames before and after the received frame number n from the video DB 252, and generates a digest video from each of the acquired video frames. Alternatively, the second extracting unit 263 acquires N pieces of 3D model data before and after the received frame number n from the 3D model DB 255, and generates a digest video from each piece of the acquired 3D model data.

When receiving information on the frame numbers n to n+m corresponding to the timing at which the third elements (kinetic postures) are extracted, the second extracting unit 263 acquires video frames corresponding to the received frame numbers n to n+m from the video DB 252, and generates a digest video from each of the acquired video frames. Alternatively, the second extracting unit 263 acquires pieces of 3D model data corresponding to the received frame numbers n to n+m from the 3D model DB 255, and generates a digest video from each piece of the acquired 3D model data.

When receiving information on the frame number n corresponding to the timing at which the fourth element (static posture) is extracted, the second extracting unit 263 acquires N video frame before and after the received frame numbers n from the video DB 252, and generates a digest video from each of the acquired video frames. Alternatively, the second extracting unit 263 acquires N pieces of 3D model data before and after the received frame number n from the 3D model DB 255, and generates a digest video from each piece of the acquired 3D model data.

When receiving information on the frame numbers n to n+m corresponding to the timing at which the fourth elements (kinetic postures) are extracted, the second extracting unit 263 acquires video frames corresponding to the received frame numbers n to n+m from the video DB 252, and generates a digest video from each of the acquired video frames. Alternatively, the second extracting unit 263 acquires pieces of 3D model data corresponding to the received frame numbers n to n+m from the 3D model DB 255, and generates a digest video from each piece of the acquired 3D model data.

The second extracting unit 263 registers information, in which the second element name, the evaluation item based on which the second element name has been extracted, and the digest video are associated, to the digest video DB 257.

The output unit 264 is a processing unit that outputs and displays, onto the display unit 240, a video of a portion corresponding to the third element or the fourth element on the basis of the digest video DB 257. For example, the output unit 264 generates information on a display screen on the basis of the digest video DB 257, and outputs the generated information on the display screen to the display unit 240. The display screen generated by the output unit 264 corresponds to, for example, the display screen 45 described above with reference to FIG. 22 in the first embodiment. In the following descriptions, similarly to the first embodiment, a digest video generated from video frames in the video DB 252 will be described as the first digest video. A digest video generated from pieces of 3D model data in the 3D model DB 255 will be described as the second digest video.

Further, when displaying the second digest video corresponding to the fourth element in the display region 45b, the output unit 264 performs the following process. The output unit 264 generates a video that is captured in a certain direction, in which a portion of a 3D model of the athlete corresponding to the evaluation item for which a deduction is larger than the threshold in a result of determination of the perfection level is viewable, and displays the generated video in the display region 45b.

When displaying the second digest video corresponding to the third element in the display region 45b, the output unit 264 generates a video by capturing the 3D model in a predetermined direction in accordance with a type of a static movement or a moving movement, and displays the generated video in the display region 45b.

Here, upon receiving the sensor data from the 3D laser sensor 20a, each of the processing units 261 to 264 of the information processing apparatus 200 stores the sensor data in the sensing DB 251 and performs a process after a lapse of a predetermined time. For example, after the athlete 10 gives a performance and a referee or the like actually determines a score, the information processing apparatus 200 generates and displays the first and the second digest videos by performing the above-described process, so that it is possible to compare the digest video and the scoring result.

Further, upon receiving the sensor data from the 3D laser sensor 20a, each of the processing units 261 to 264 of the information processing apparatus 200 may perform the process in real time. With this configuration, it is possible to refer to a digest video of a portion in which a difficult element is successful or a portion corresponding to a large fault during a scoring waiting time in a competition.

Figure 27:
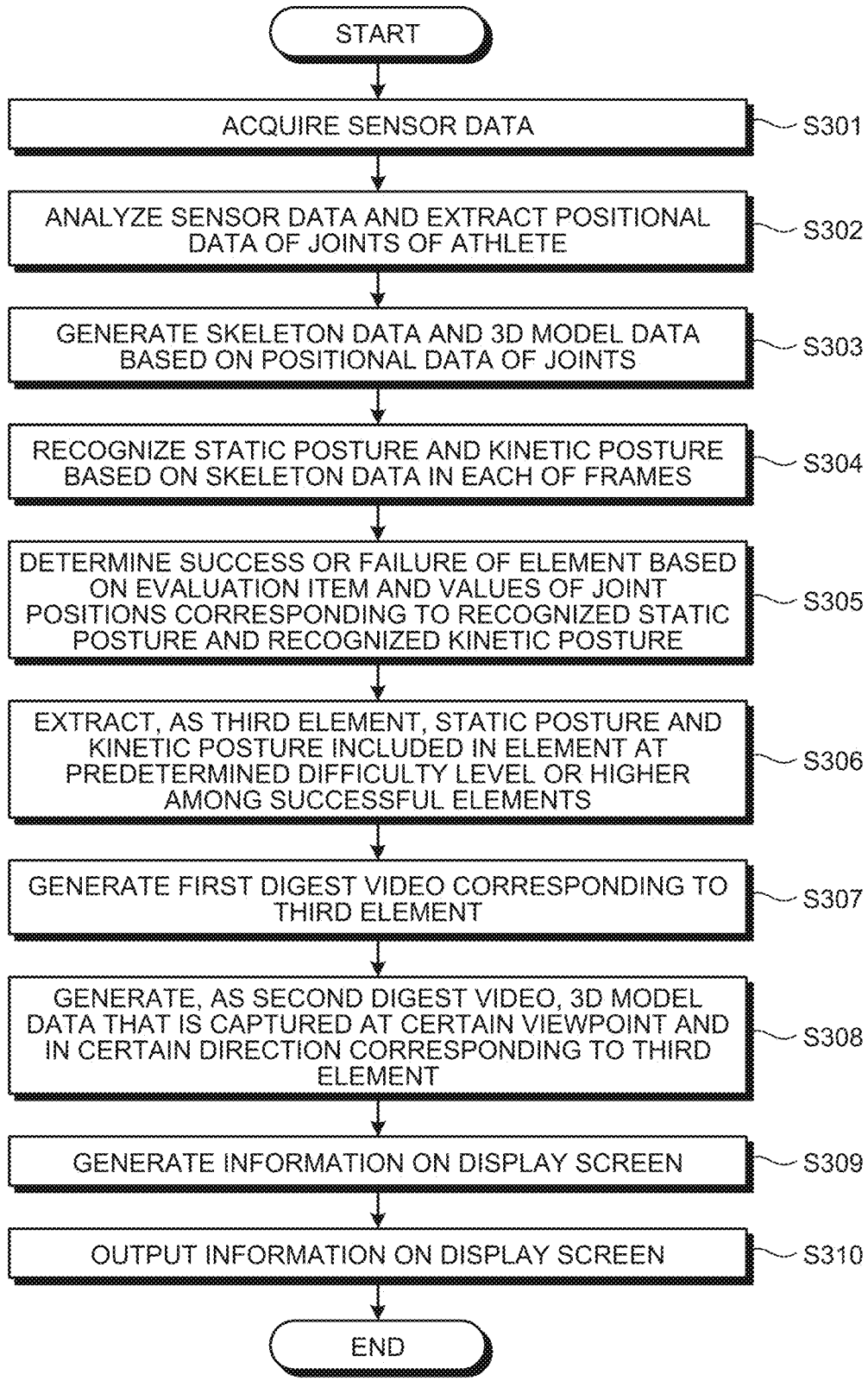
FIG. 27 is a first flowchart illustrating the flow of a process performed by the information processing apparatus according to the second embodiment.

An example of the flow of a process performed by the information processing apparatus 200 according to the second embodiment will be described below. FIG. 27 is a first flowchart illustrating the flow of the process performed by the information processing apparatus according to the second embodiment. As illustrated in FIG. 27, the registering unit 261 of the information processing apparatus 200 acquires sensor data from the 3D laser sensor 20a (Step S301). The first extracting unit 262 of the information processing apparatus 200 analyzes the sensor data and extracts positional data of joints of the athlete 10 (Step S302).

The first extracting unit 262 generates skeleton data and 3D model data on the basis of the positional data on the joints (Step S303). The first extracting unit 262 recognizes a static posture and a kinetic posture on the basis of the skeleton data (joint position) in each of the frames (Step S304).

The first extracting unit 262 determines success or failure of an element on the basis of the evaluation item and values of joint positions corresponding to the recognized static posture and the recognized kinetic posture (Step S305). The first extracting unit 262 extracts, as a third element, a static posture and a kinetic posture that are included in an element at a predetermined difficulty level or higher among successful elements (Step S306).

The second extracting unit 263 of the information processing apparatus 200 generates a first digest video corresponding to the third element (Step S307). The output unit 264 of the information processing apparatus 200 generates, as a second digest video, 3D model data that is captured at a certain viewpoint and in a certain direction corresponding to the third element (Step S308).

The output unit 264 generates information on a display screen (Step S309), and outputs the information on the display screen to the display unit 240 (Step S310).

Figure 28:
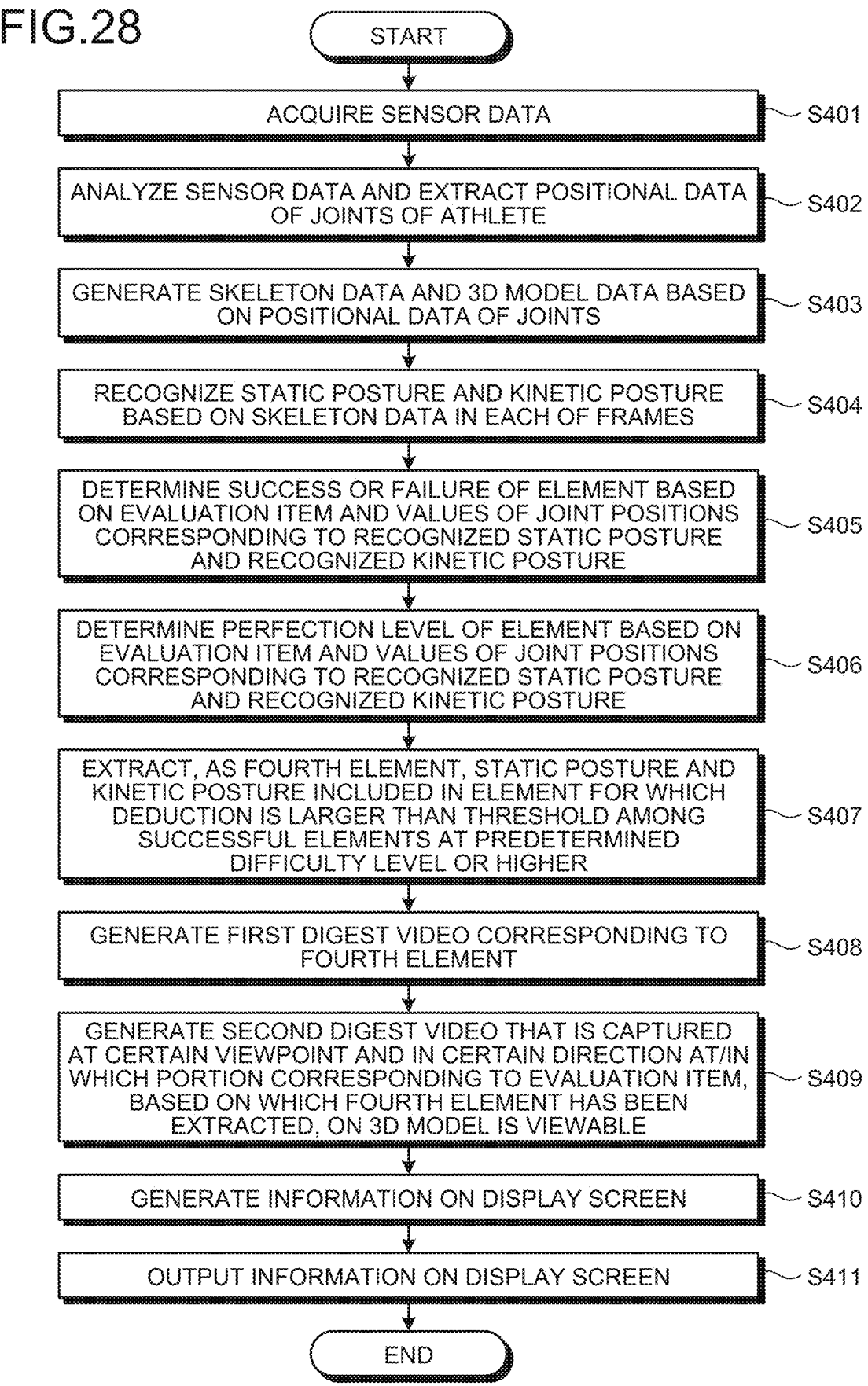
FIG. 28 is a second flowchart illustrating the flow of a process performed by the information processing apparatus according to the second embodiment.

FIG. 28 is a second flowchart illustrating the flow of the process performed by the information processing apparatus according to the second embodiment. As illustrated in FIG. 28, the registering unit 261 of the information processing apparatus 200 acquires sensor data from the 3D laser sensor 20a (Step S401). The first extracting unit 262 of the information processing apparatus 200 analyzes the sensor data and extracts positional data of joints of the athlete 10 (Step S402).

The first extracting unit 262 generates skeleton data and 3D model data on the basis of the positional data of the joints (Step S403). The first extracting unit 262 recognizes a static posture and a kinetic posture on the basis of the skeleton data (joint position) in each of the frames (Step S404).

The first extracting unit 262 determines success or failure of an element on the basis of the evaluation item and values of joint positions corresponding to the recognized static posture and the recognized kinetic posture (Step S405). The first extracting unit 262 determines a perfection level of the element on the basis of the evaluation item and the values of the joint positions corresponding to the recognized static posture and the recognized kinetic posture (Step S406).

The first extracting unit 262 extracts, as a fourth element, a static posture and a kinetic posture that are included in an element for which a deduction is larger than a threshold among successful elements at a predetermined difficulty level or higher (Step S407). The second extracting unit 263 of the information processing apparatus 200 generates a first digest video corresponding to the fourth element (Step S408).

The second extracting unit 263 generates a second digest video that is captured at a certain viewpoint and in a certain direction at/in which a portion corresponding to the evaluation item, based on which the fourth element has been extracted, on the 3D model is viewable (Step S409).

The output unit 264 generates information on a display screen (Step S410), and outputs the information on the display screen to the display unit 240 (Step S411).

In FIG. 27 and FIG. 28, as one example, the processes for extracting the third element and the fourth element are described separately, but embodiments are not limited to this example. The information processing apparatus 200 may perform the processes for extracting the third element and the fourth element in parallel. Alternatively, the information processing apparatus 200 may extract the fourth element after extracting the third element, or may extract a third element after extracting the fourth element.

Effects of the information processing apparatus 200 according to the second embodiment will be described below. For example, in video extraction in a scoring competition, it is desired to extract a video of a performance for which a difficulty level of an element is high. Further, it is preferable to extract a video by taking into account various factors, such as success or failure of an element at a high difficulty level and a range of deductions. In the conventional technology, when a partial video is to be extracted from a series of videos, it is possible to extract a specific play, but it is impossible to extract a video by taking into account various factors, such as a difficulty level of an element, success or failure of an element at a high difficulty level, or a range of deductions, in a scoring competition.

In contrast, the information processing apparatus 200 extracts the third element for which a difficulty level is equal to or higher than a predetermined level among successful elements performed by the athlete 10, and generates and displays a digest video corresponding to the third element. Therefore, it is possible to display a video of a successful element at a predetermined difficulty level or higher from among videos of a series of performance in a scoring competition.

Further, if the difficulty level of the element performed by the athlete 10 is equal to or higher than a threshold, the information processing apparatus 200 extracts, as the fourth element, an element for which a deduction related to the element (a static posture and a kinetic posture) with respect to static postures and kinetic postures included in the element is equal to or larger than a threshold. The information processing apparatus 200 generates and displays a digest video corresponding to the extracted fourth element. Therefore, it is possible to display a video of an element for which a difficulty level is equal to or higher than a predetermined level and for which a deduction is large, from among videos of a series of performance related to a scoring competition.

For example, it is possible to provide a digest video corresponding to the third and the fourth elements as a more interesting digest video to viewers of sports news, and it is also effective to extract a training video for athletes and educational data for referees.

Third Embodiment

The processes performed by the information processing apparatuses 100 and 200 described above in the first and the second embodiments are mere examples. Here, other processes (1) and (2) will be described by using the functional block diagram of the information processing apparatus 100 illustrated in FIG. 5.

The other process (1) performed by the information processing apparatus 100 will be described. In some cases, the athlete 10 may give a plurality of performances in a single competition or perform the same performance in a plurality of competitions. Therefore, the information processing apparatus 100 stores sensor data of each of performances given by the athlete 10 in the sensing DB 151. Here, the information processing apparatus 100 stores the sensor data and a recording ID by which each of performances given by the same athlete 10 is distinguishable in the sensing DB 151 in an associated manner. The information processing apparatus 100 performs the processes of extracting the first element and the second element as described above, on the basis of the sensor data associated with each of the recording IDs. The information processing apparatus 100 may generate a digest video of the first element and the second element of each of the performances, and display the digest video of each of the performances in a comparable manner. For example, the information processing apparatus 100 generates and displays a display screen 46 illustrated in FIG. 29.

Figure 29:
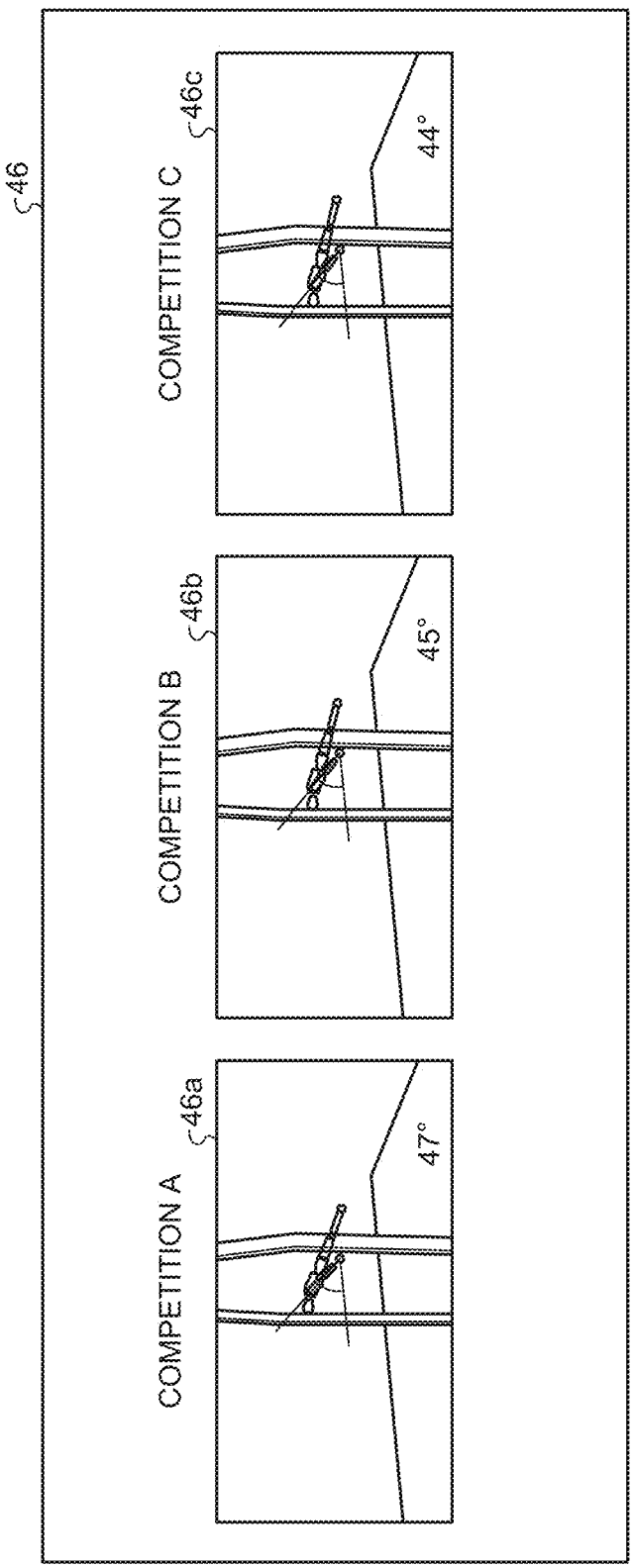
FIG. 29 is a diagram illustrating a first example of a display screen according to a third embodiment.

FIG. 29 is a diagram illustrating a first example of the display screen according to the third embodiment. In the example illustrated in FIG. 29, the display screen 46 includes display regions 46a, 46b, and 46c. The display region 46a is a region for displaying a second digest video that is generated based on sensor data of the athlete 10 measured in a competition A. The display region 46b is a region for displaying a second digest video that is generated based on sensor data of the athlete 10 measured in a competition B. The display region 46c is a region for displaying a second digest video that is generated based on sensor data of the athlete 10 measured in a competition C.

For example, the athlete 10 is able to check a result of the performance in each of the competitions by using each of the digest videos that are extracted on the basis of scores, by referring to the display screen 46. Further, in FIG. 29, as one example, a case has been described in which the digest videos corresponding to the first element and the second element are extracted, but embodiments are not limited to this example. The information processing apparatus 100 may generate and display digest videos corresponding to the third element and the fourth element described in the second embodiment.

The other process (2) performed by the information processing apparatus 100 will be described. In the first and the second embodiments as described above, as one example, the sensor data of the same athlete 10 is measured, the first to the fourth elements are extracted, and digest videos corresponding to the first to the fourth elements are extracted; however, embodiments are not limited to this example. With respect to a plurality of different athletes (for example, athletes 10a to 10c (not illustrated)), the information processing apparatus 100 may similarly extract the first to the fourth elements from each of the athletes 10a to 10c and generate digest videos corresponding to the first to the fourth elements.

The information processing apparatus 100 stores the sensor data and the recording ID by which each of performances given by the athletes 10a to 10c is distinguishable in the sensing DB 151 in an associated manner. The information processing apparatus 100 determines a successful element among elements performed by each of the athletes 10a to 10c on the basis of the sensor data associated with each of the recording IDs. Further, the information processing apparatus 100 extracts information on elements that belong to the same group among successful elements performed by each of the athletes 10a to 10c.

For example, it is assumed that the athlete 10a succeeded in an element A1 in a group G1, the athlete 10b succeeded in an element A2 in the group G1, and the athlete 10c succeeded in an element A3 in the group G1. In this case, the athletes 10a to 10c succeeded in the elements in the same group G1, and therefore, the information processing apparatus 100 acquires an evaluation result of a score for the successful element A1 performed by the athlete 10a, an evaluation result of a score for the successful element A2 performed by the athlete 10b, and an evaluation result of a score for the successful element A3 performed by the athlete 10c.

For example, the information processing apparatus 100 performs the process of evaluating the score as described in the first embodiment, to thereby acquire a value of a deduction for a static posture of the element A1 performed by the athlete 10a, a value of a deduction for a static posture of the element A2 performed by the athlete 10b, and a value of a deduction for a static posture of the element A3 performed by the athlete 10b.

The information processing apparatus 100 determines whether the value of the deduction for the static posture of the element A1 performed by the athlete 10a, the value of the deduction for the static posture of the element A2 performed by the athlete 10b, and the value of the deduction for the static posture of the element A3 performed by the athlete 10b are different from one another. If the values of the deductions are different from one another, the information processing apparatus 100 determines that the static posture of the element A1, the static posture of the element A2, and the static posture of the element A3 are elements that lead to a difference in a score from other athletes. For example, it is assumed that a frame number in which the athlete 10a has performed the static posture of the element A1 is a frame number n1, a frame number in which the athlete 10b has performed the static posture of the element A2 is a frame number n2, and a frame number in which the athlete 10c has performed the static posture of the element A3 is a frame number n3. Further, it is assumed that a body angle is adopted as the evaluation item. The body angle is an angle between a straight line that connects the joints assigned with the numbers 0 and 7 and the horizontal reference.

Meanwhile, the information processing apparatus 100 may compare differences in deductions of elements that belong to the same group with respect to all of the athletes, and determine an element for which a difference in a deduction is equal to or larger than a threshold as an element that leads to a difference in a score from the other athletes. Here, the difference in the deduction may be a value of a difference between an average of values of deductions of all of the athletes and a value of a deduction for each of the athletes, or a value of a difference between a median value of the values of the deductions of all of the athletes and the value of the deduction for each of the athletes.

Figure 30:
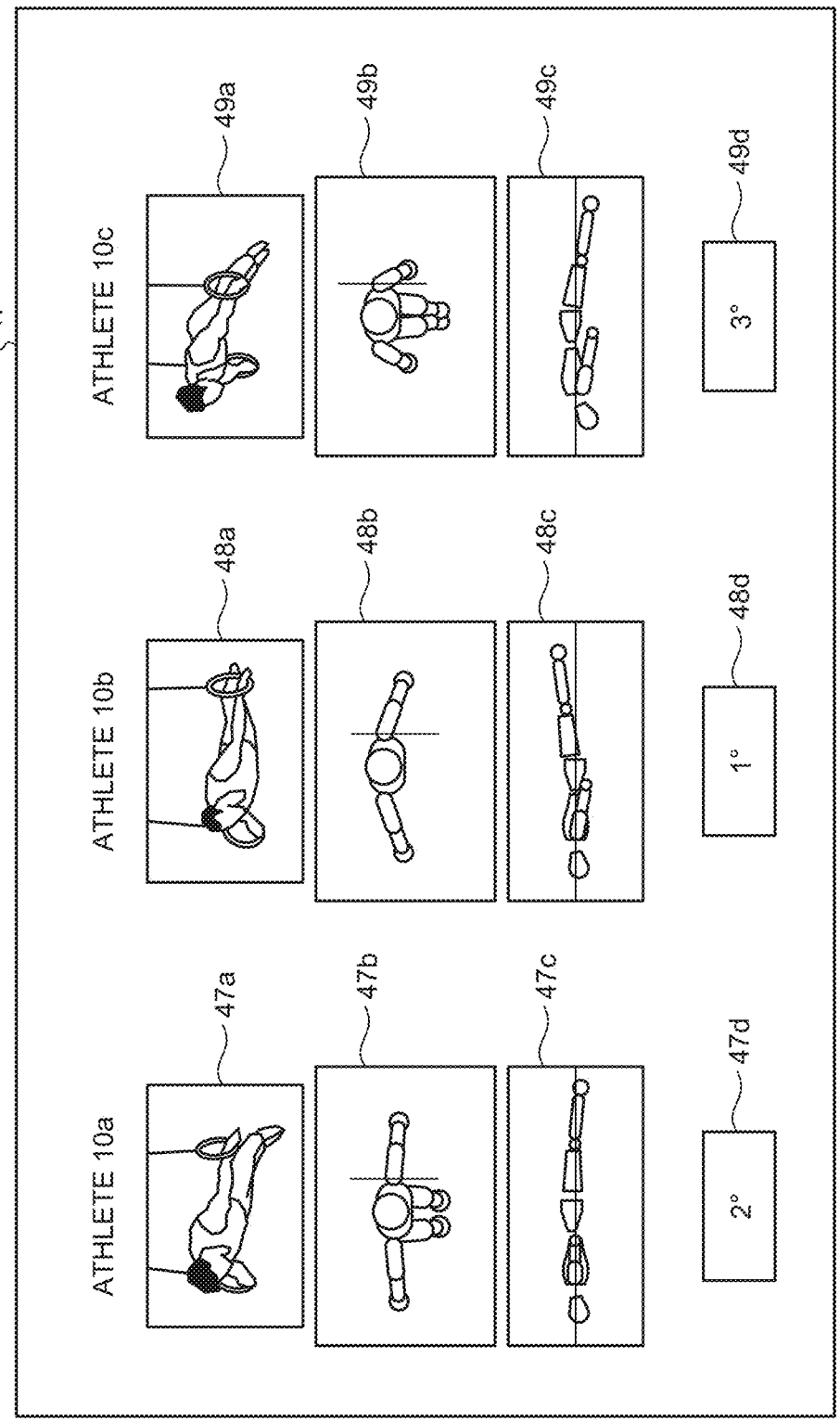
FIG. 30 is a diagram illustrating a second example of the display screen according to the third embodiment.

The information processing apparatus 100 generates a display screen for displaying information on the element that leads to the difference in the score from the other athletes, and displays the display screen on the display unit 140. FIG. 30 is a diagram illustrating a second example of the display screen according to the third embodiment. A display screen 47 illustrated in FIG. 30 includes display regions 47a, 47b, 47c, and 47d, display regions 48a, 48b, 48c, and 48d, and display regions 49a, 49b, 49c, and 49d.

The display region 47a is a region for displaying a first digest video that is generated based on video data of the athlete 10a. For example, the information processing apparatus 100 generates the first digest video from N video frames before and after a frame number n1 with respect to the athlete 10a, and displays the first digest video in the display region 47a.

The display regions 47b and 47c are regions for displaying second digest videos that are generated based on 3D model data of the athlete 10a. Meanwhile, a video that is obtained by capturing the 3D model data from a front side is displayed in the display region 47b, and a video that is obtained by capturing the 3D model data from a lateral direction is displayed in the display region 47c. For example, the information processing apparatus 100 generates, as the second digest video, a video by capturing N pieces of 3D model data before and after the frame number n1 with respect to the athlete 10a in a certain direction, and displays the second digest video in each of the display regions 47b and 47c.

The display region 47d is a region for displaying a value corresponding to the evaluation item (for example, a body angle of the athlete 10a). The information processing apparatus 100 may display a value of a deduction related to the body angle of the athlete 10a in addition to displaying the evaluation item in the display region 47d.

The display region 48a is a region for displaying a first digest video that is generated based on video data of the athlete 10b. For example, the information processing apparatus 100 generates the first digest video from N video frames before and after a frame number n2 with respect to the athlete 10b, and displays the first digest video in the display region 48a.

The display regions 48b and 48c are regions for displaying second digest videos that are generated based on 3D model data of the athlete 10b. Meanwhile, a video that is obtained by capturing the 3D model data from a front side is displayed in the display region 48b, and a video that is obtained by capturing the 3D model data from a lateral direction is displayed in the display region 48c. For example, the information processing apparatus 100 generates, as the second digest video, a video by capturing N pieces of 3D model data before and after the frame number n2 with respect to the athlete 10b in a certain direction, and displays the second digest video in each of the display regions 48b and 48c.

The display region 48d is a region for displaying a value corresponding to the evaluation item (for example, the body angle of the athlete 10b). The information processing apparatus 100 may display a value of a deduction related to the body angle of the athlete 10b in addition to displaying the evaluation item in the display region 48d.

The display region 49a is a region for displaying a first digest video that is generated based on video data of the athlete 10c. For example, the information processing apparatus 100 generates the first digest video from N video frames before and after a frame number n3 with respect to the athlete 10c, and displays the first digest video in the display region 49a.

The display regions 49b and 49c are regions for displaying second digest videos that are generated based on 3D model data of the athlete 10c. Meanwhile, a video that is obtained by capturing the 3D model data from a front side is displayed in the display region 49b, and a video that is obtained by capturing the 3D model data from a lateral direction is displayed in the display region 49c. For example, the information processing apparatus 100 generates, as the second digest video, a video by capturing N pieces of 3D model data before and after the frame number n3 with respect to the athlete 10c in a certain direction, and displays the second digest video in each of the display regions 49b and 49c.

The display region 49d is a region for displaying a value corresponding to the evaluation item (for example, the body angle of the athlete 10c). The information processing apparatus 100 may display a value of a deduction related to the body angle of the athlete 10c in addition to displaying the evaluation item in the display region 49d.

In the example illustrated in FIG. 30, a case has been described in which the information processing apparatus 100 displays the first digest video, the second digest videos, and the value of the evaluation item corresponding to the static posture in each of the display regions; however, embodiments are not limited to this example. The information processing apparatus 100 may similarly display a kinetic posture in each of the display regions with respect to elements that belong to the same group as long as a difference in a deduction for the element is large.

As descried above with reference to FIG. 30, if the differences in the deductions among the athletes are large with respect to elements that belong to the same group, the information processing apparatus 100 generates and displays the display screen 47 on the display unit 140, so that an athlete is able to refer to portions in videos related to an element that leads to a difference in a score from the other athletes.

Figure 31:
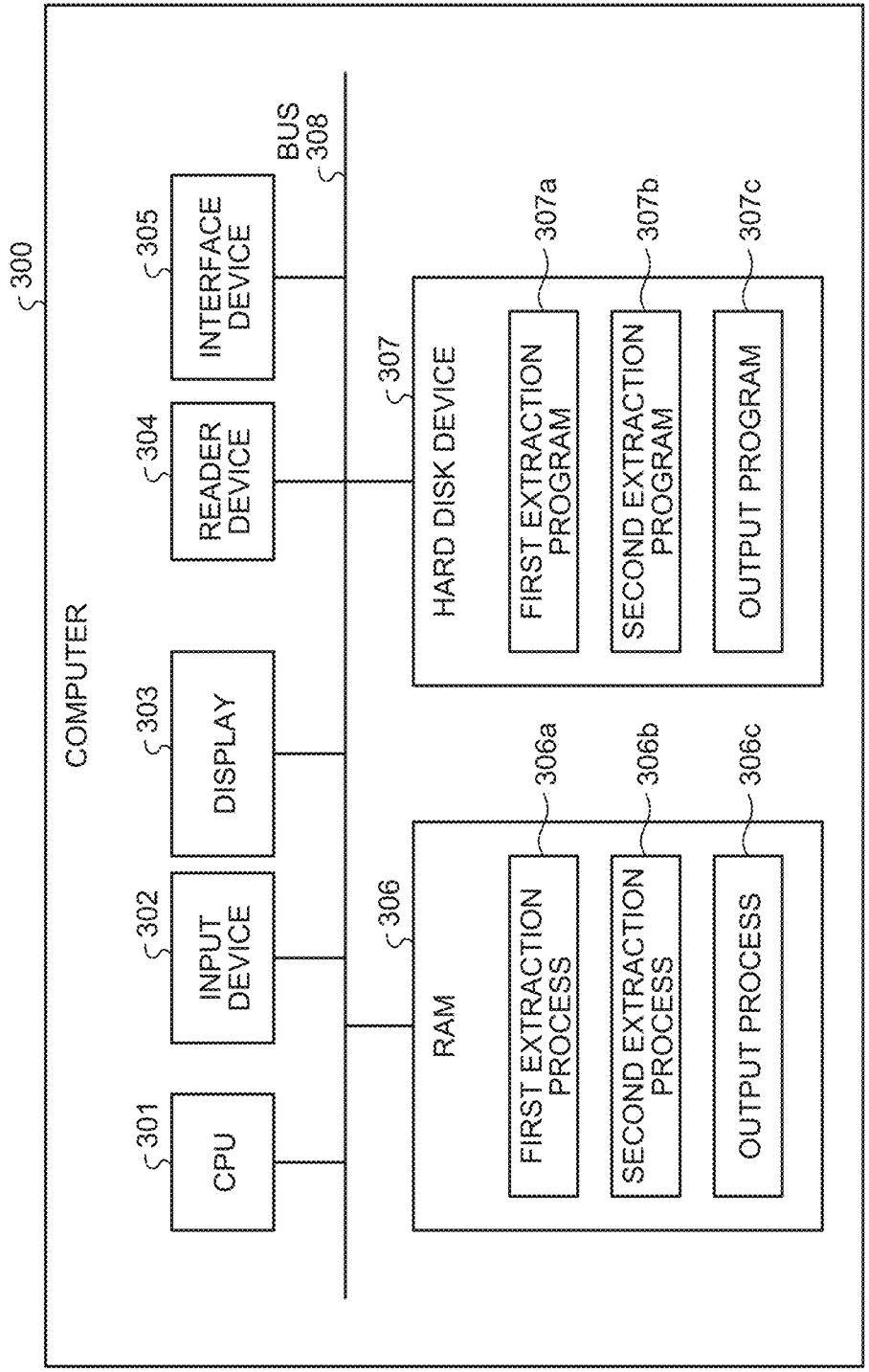
FIG. 31 is a diagram illustrating an example of a hardware configuration of a computer that implements the same functions as those of the information processing apparatus.

An example of a hardware configuration of a computer that implements the same functions as those of the information processing apparatus 100 (200) described in the embodiments will be described below. FIG. 31 is a diagram illustrating an example of the hardware configuration of the computer that implements the same functions as those of the information processing apparatus.

As illustrated in FIG. 31, a computer 300 includes a CPU 301 that performs various kinds of arithmetic processing, an input device 302 that receives input of data from a user, and a display 303. Further, the computer 300 includes a reader device 304 that reads a program or the like from a storage medium, and an interface device 305 that transmits and receives data to and from other computers via a wireless network. Furthermore, the computer 300 includes a RAM 306 for temporarily storing various kinds of information and a hard disk device 307. The devices 301 to 307 are connected to a bus 308.

The hard disk device 307 includes a first extraction program 307a, a second extraction program 307b, and an output program 307c. The CPU 301 reads the first extraction program 307a, the second extraction program 307b, and the output program 307c, and loads the programs onto the RAM 306.

The first extraction program 307a functions as a first extraction process 306a. The second extraction program 307b functions as a second extraction process 306b. The output program 307c functions as an output process 306c.

Processes in the first extraction process 306a correspond to the processes performed by the first extracting units 162 and 262. Processes in the second extraction process 306b correspond to the processes performed by the second extracting units 163 and 263. Processes in the output process 306c correspond to the processes performed by the output units 164 and 264.

Meanwhile, each of the programs 307a to 307c need not always be stored in the hard disk device 307 from the beginning. For example, each of the programs may be stored in a "portable physical medium", such as a flexible disk (FD), a compact disc (CD)-ROM, a digital versatile disk (DVD), a magneto optical disk, or an integrated circuit (IC) card. Then, the computer 300 may read and execute each of the programs 307a to 307d.

It is possible to extract a video with reference to a score from a series of videos related to a scoring competition.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable recording medium having stored therein an extraction program that causes a computer to execute a process comprising:
    acquiring sensor data and video data of a series of performances that is given by an athlete and includes elements;
    extracting positional data of joints of the athlete by analyzing the acquired sensor data;
    generating skeleton data and 3D model data of the athlete based on the extracted positional data;
    recognizing a posture of the athlete performing each of the elements, based on the generated skeleton data;
    extracting from among the elements an element as a first element by determining whether an evaluation item of the element falls within a predetermine range from a first reference for determining success or failure of the element, and an element as a second element by determining whether the evaluation item of the element falls within a predetermined range from a second reference for determining a perfection level of the element, based on the recognized posture and posture success condition stored in a storage unit wherein the posture success condition includes evaluation items;
    extracting a first portion of the generated 3D model data corresponding to one of the first element and the second element and a second portion of the acquired video data corresponding to the first portion; and
    outputting at least one of the extracted first portion of the generated 3D model data and the extracted second portion of the acquired video data.

2. The non-transitory computer readable recording medium according to claim 1, wherein
    the outputting outputs the extracted first portion of the generated 3D model data that corresponds to 3D data that is generated based on sensor data that is acquired from a viewpoint and a direction from which a portion of the 3D model data of the athlete is viewable, the portion relating to the first reference or the second reference.

3. The non-transitory computer readable recording medium according to claim 1, wherein
    the extracting includes extracting, from among the elements, an element for which a value of a deduction relating to the perfection level is equal to or larger than a predetermined threshold.

4. The non-transitory computer readable recording medium according to claim 1, wherein
    the acquiring acquires sensor data of a plurality of series of performances that is given by different athletes, and
    the extracting the first portion extracts first portions respectively for the different athletes and corresponding to the second element for which a difference in deduction values relating to the perfection level exits among the athletes.

5. The non-transitory computer readable recording medium according to claim 1, further comprising:

when a plurality of second references for determining the perfection level is provided, a certain second reference that is specified from among the plurality of second references is used as the second reference.

6. An extraction method comprising:

acquiring sensor data and video data of a series of performances that is given by an athlete and includes elements, using a processor;

extracting positional data of joints of the athlete by analyzing the acquired sensor data, using the processor;

generating skeleton data and 3D model data of the athlete based on the extracted positional data, using the processor;

recognizing a posture of the athlete performing each of the elements, based on the generated skeleton data, using the processor;

extracting from among the elements an element as a first element by determining whether an evaluation item of the element falls within a predetermine range from a first reference for determining success or failure of the element, and an element as a second element by determining whether the evaluation item of the element falls within a predetermined range from a second reference for determining a perfection level of the element, based on the recognized posture and posture success condition stored in a storage unit wherein the posture success condition includes evaluation items, using the processor;

extracting a first portion of the generated 3D model data corresponding to one of the first element and the second element and a second portion of the acquired video data corresponding to the first portion, using the processor; and outputting at least one of the extracted first portion of the generated 3D model data and the extracted second portion of the acquired video data, using the processor.

7. An information processing apparatus comprising:

a processor configured to acquire sensor data and video data of a series of performances that is liven by an athlete and includes elements;

extract positional data of joints of the athlete by analyzing the acquired sensor data;

generate skeleton data and 3D model data of the athlete based on the extracted positional data;

recognize a posture of the athlete performing each of the elements, based on the generated skeleton data;

extract from among the elements an element as a first element by determining whether an evaluation item of the element falls within a predetermine range from a first reference for determining success or failure of the element, and an element as a second element by determining whether the evaluation item of the element falls within a predetermined range from a second reference for determining a perfection level of the element, based on the recognized posture and posture success condition stored in a storage unit wherein the posture success condition includes evaluation items;

a second extracting unit configured to extract a first portion of the generated 3D model data corresponding to one of the first element and the second element and a second portion of the acquired video data corresponding to the first portion; and an output unit configured to output at least one of the extracted first portion of the generated 3D model data and the extracted second portion of the acquired video data.

* * * * *